United States Patent
Ding et al.

(10) Patent No.: US 11,223,597 B2
(45) Date of Patent: Jan. 11, 2022

(54) NETWORK AND NETWORK MANAGEMENT METHOD

(71) Applicant: Huawei Technologies Co., Ltd., Shenzhen (CN)

(72) Inventors: Lei Ding, Hangzhou (CN); Shaofu Zuo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 24 days.

(21) Appl. No.: 16/897,000

(22) Filed: Jun. 9, 2020

(65) Prior Publication Data
US 2020/0304456 A1    Sep. 24, 2020

Related U.S. Application Data

(63) Continuation of application No. PCT/CN2017/115419, filed on Dec. 11, 2017.

(51) Int. Cl.
*G06F 15/16* (2006.01)
*H04L 29/12* (2006.01)
(Continued)

(52) U.S. Cl.
CPC ............ *H04L 61/103* (2013.01); *H04L 43/10* (2013.01); *H04L 45/54* (2013.01); *H04L 45/745* (2013.01);
(Continued)

(58) Field of Classification Search
CPC ....... H04L 61/103; H04L 43/10; H04L 45/54; H04L 45/745; H04L 61/2015; H04L 61/6022
(Continued)

(56) References Cited

U.S. PATENT DOCUMENTS

2005/0201381 A1* 9/2005 Abbasi ................. H04L 67/322
370/395.21
2013/0097335 A1    4/2013 Jiang et al.
(Continued)

FOREIGN PATENT DOCUMENTS

CN    103152264 A    6/2013
CN    103269278 A    8/2013
(Continued)

OTHER PUBLICATIONS

Sharma, S., et al., "Automatic bootstrapping of OpenFlow networks," 19th IEEE Workshop on Local & Metropolitan Area Networks (LANMAN), Apr. 10-12, 2013. (Year: 2013).*
(Continued)

*Primary Examiner* — Kaylee J Huang
(74) *Attorney, Agent, or Firm* — Conley Rose, P.C.

(57) ABSTRACT

A network, including a first switch, a second switch, and a controller, where a management port of the first switch is coupled to a first forwarding port of the first switch, and a third forwarding port of the first switch is coupled to a fourth forwarding port of the second switch. In a boot phase of the network, the first switch communicates with a Dynamic Host Configuration Protocol (DHCP) server using a preset flow table, and obtains an Internet Protocol (IP) address of the first switch. The controller learns a connection relationship between forwarding ports of the first switch and the second switch using a probe packet and a probe flow table in order to control the first switch and the second switch.

20 Claims, 16 Drawing Sheets

(51) Int. Cl.
*H04L 12/26* (2006.01)
*H04L 12/741* (2013.01)

(52) U.S. Cl.
CPC ...... *H04L 61/2015* (2013.01); *H04L 61/6022* (2013.01)

(58) Field of Classification Search
USPC .................................. 709/245, 217, 223, 227
See application file for complete search history.

(56) References Cited

U.S. PATENT DOCUMENTS

| | | | |
|---|---|---|---|
| 2015/0200808 A1* | 7/2015 | Gourlay | H04L 47/20 709/225 |
| 2015/0326526 A1 | 11/2015 | Zeng et al. | |
| 2015/0334085 A1* | 11/2015 | Li | H04L 61/2015 709/245 |
| 2015/0341253 A1 | 11/2015 | Scheurich et al. | |
| 2016/0112371 A1* | 4/2016 | Zhou | H04L 61/2015 709/245 |
| 2016/0330167 A1* | 11/2016 | Cai | H04L 67/2842 |
| 2017/0180213 A1 | 6/2017 | Li et al. | |
| 2017/0230231 A1* | 8/2017 | Hsu | H04L 45/28 |
| 2017/0310586 A1* | 10/2017 | Lin | H04L 12/6418 |
| 2018/0026857 A1* | 1/2018 | Nyhus | H04W 12/06 709/222 |

FOREIGN PATENT DOCUMENTS

| | | |
|---|---|---|
| CN | 103763194 A | 4/2014 |
| CN | 104283983 A | 1/2015 |
| CN | 105391568 A | 3/2016 |
| CN | 105429875 A | 3/2016 |
| CN | 105430113 A | 3/2016 |
| CN | 106375223 A | 2/2017 |
| CN | 106506515 A | 3/2017 |
| CN | 106685861 A | 5/2017 |
| CN | 104283790 B | 9/2017 |
| CN | 107395505 A | 11/2017 |
| EP | 2940971 A1 | 11/2015 |
| WO | 2004042999 A1 | 5/2004 |

OTHER PUBLICATIONS

Sharma, S., et al., "Automatic bootstrapping of OpenFlow networks," 19th IEEE Workshop on Local & Metropolitan Area Networks (LANMAN), Apr. 10-12, 2013, 6 pages.

XP055753281, Shivayogimath, C., et al., "Modification of L3 Learning Switch Code for Firewall Functionality in Pox Controller (Working on SDN With Mininet)," Published 2015 Engineering International Journal of Research in Engineering and Technology, 6 pages.

ONF Open Network Foundation MPLS-TP OpenFlow Protocol Extensions for SPTN Version 1.0, Jun. 16, 2017, 71 pages.

* cited by examiner

NETWORK AND NETWORK MANAGEMENT METHOD

CROSS-REFERENCE TO RELATED APPLICATIONS

This application is a continuation of International Patent Application No. PCT/CN2017/115419 filed on Dec. 11, 2017, which is hereby incorporated by reference in its entirety.

TECHNICAL FIELD

This application relates to the field of computer technologies, and in particular, to a network and a network management method.

BACKGROUND

In a network, a connection between a control plane of a switch and a controller usually uses one network, which is referred to as a control network, and a connection between forwarding planes of different switches usually uses another network, which is referred to as a forwarding network. In a network boot phase, the controller needs to guide various devices in the network, including the controller, the switch, a server, and the like, from an out-of-control or out-of-order state to a controlled or ordered state. The boot phase includes allocation of device resources such as Internet Protocol (IP) addresses, discovery of a topology relationship between devices, and the like.

In the boot phase, the controller cannot accurately design a packet forwarding path in the absence of information such as a switch port connection relationship and a network topology structure. Therefore, a packet, such as a Dynamic Host Configuration Protocol (DHCP) packet, is usually sent to a destination in a broadcast mode in the boot phase. In this process, a large quantity of broadcast packets is generated, and network boot efficiency is affected.

SUMMARY

This application provides a network and a management method applied to the network in order to reduce a quantity of broadcast packets in a boot process and improve boot efficiency.

A first aspect of this application provides a network, where the network includes a plurality of switches and a controller, and each switch includes a management port and a plurality of available forwarding ports. In the plurality of switches, a first switch is connected to a DHCP server, and other switches communicate with the DHCP server using the first switch. Starting from the first switch, a boot process of the network spreads layer by layer. After the first switch is controlled, a next-hop switch of the first switch starts a boot process, and so on, until all the switches in the network are controlled. A first forwarding port, a second forwarding port, a third forwarding port, a fourth forwarding port, a fifth forwarding port, a sixth forwarding port, and a seventh forwarding port in this application are all available forwarding ports.

A management port of the first switch is connected to the first forwarding port of the first switch, and the third forwarding port of the first switch is connected to the fourth forwarding port of a second switch. The second forwarding port of the first switch is connected to the DHCP server and the controller. That is, the controller and the DHCP server are deployed on a same physical server. Therefore, a DHCP request generated by the second switch needs to be sent to the DHCP server using the first switch. A first preset flow table and a second preset flow table that belong to each switch are preset in the switch.

The first switch is configured to generate a first DHCP request, match a first preset flow table of the first switch with the first DHCP request, and send the first DHCP request through all available forwarding ports of the first switch based on the first preset flow table, including sending the first DHCP request through the second forwarding port and sending the first DHCP request through the third forwarding port.

The second switch is configured to receive the first DHCP request, discard the first DHCP request after determining that the first DHCP request does not match a preset flow table of the second switch, generate a second DHCP request, where the second DHCP request is used to request, from the DHCP server, an IP address of the second switch, and send the second DHCP request to the third forwarding port of the first switch through the fourth forwarding port.

The DHCP server is configured to receive the first DHCP request sent through the second forwarding port, generate a first DHCP reply based on the first DHCP request, and send the first DHCP reply to the first switch.

The first switch is configured to receive the first DHCP reply from the third forwarding port, match a second preset flow table of the first switch with the first DHCP reply, send the first DHCP reply through all the available forwarding ports of the first switch based on the second preset flow table, including sending the first DHCP reply through the first forwarding port, receive, using the management port of the first switch, the first DHCP reply sent through the first forwarding port. So far, a control plane of the first switch obtains an IP address of the first switch that is allocated by the DHCP server and that is carried in the first DHCP reply.

In addition, the first switch is configured to receive the second DHCP request from the third port, and match the second DHCP request with preset flow tables stored in the first switch, including the first preset flow table and the second preset flow table. Then, the first switch determines that the second DHCP request does not match the first preset flow table or the second preset flow table, and discards the second DHCP request.

In a boot process of the network provided above, the first switch can obtain the IP address allocated to the first switch, and partial control on the first switch is implemented. In addition, because the DHCP request generated by the second switch (any switch adjacent to the first switch) in this phase cannot match a preset flow table in the first switch or another adjacent switch of the second switch, the DHCP request generated by the second switch cannot be further broadcast in the network, thereby greatly reducing broadcast traffic in the network.

In a possible design, a source media access control (MAC) address of the first DHCP request is a MAC address of the first switch. The first preset flow table instructs to send a packet whose source MAC address is the MAC address of the first switch through all the available forwarding ports of the first switch.

In a possible design, a destination MAC address of the first DHCP reply is the MAC address of the first switch. The second preset flow table instructs to send a packet whose destination MAC address is the MAC address of the first switch through all the available forwarding ports of the first switch.

Therefore, a preset flow table stored in a switch in the network can match only a DHCP packet whose source address or destination address is an address of the switch, and cannot match a DHCP packet sent by another switch, thereby blocking a broadcast range of a DHCP packet generated by an adjacent switch, and reducing broadcast traffic in the network.

In a possible design, the controller controls a switch in the network. To be specific, the controller learns of a connection relationship between forwarding ports of switches in the network, address information, and the like.

The first switch is configured to establish a Transmission Control Protocol (TCP) connection to the controller based on the IP address of the first switch that is carried in the first DHCP reply.

The controller is configured to generate a first flow table, and send the first flow table to the first switch, where the first flow table instructs to send a packet whose destination is the first switch through the first forwarding port. In addition, the controller sets a priority of the first flow table to be higher than that of the second preset flow table, or the controller instructs the first switch to delete the second preset flow table after receiving the first flow table.

Using the first flow table, when receiving a packet whose destination is the first switch (that is, the control plane of the first switch), a forwarding plane of the first switch may match the packet with the first flow table, and send the packet to the management port of the first switch through the first forwarding port such that the packet enters the control plane of the first switch. Therefore, the first switch does not need to broadcast the packet through all the available forwarding ports, thereby improving packet processing efficiency.

In a possible design, a specific process of generating the first flow table is as follows.

The controller is configured to generate a first Address Resolution Protocol (ARP) probe flow table, where the first ARP probe flow table instructs to report, to the controller, an ARP type packet whose source IP address is the IP address of the first switch, send the first ARP probe flow table to the first switch, generate a first ARP request, where a destination IP address of the first ARP request is the IP address of the first switch, send the first ARP request to the first switch, and instruct the first switch to send the first ARP request through all the available forwarding ports of the first switch.

The first switch is configured to receive the first ARP probe flow table, receive, using the management port of the first switch, the first ARP request sent through the first forwarding port, generate a first ARP reply based on the first ARP request, where a source IP address of the first ARP reply is the IP address of the first switch, send the first ARP reply to the first forwarding port using the management port of the first switch, match the first ARP probe flow table with the first ARP reply, and report the first ARP reply and a port number of the first forwarding port based on the first ARP probe flow table.

The controller is configured to generate the first flow table based on the first ARP reply and the port number of the first forwarding port.

In the foregoing process, the controller learns address information of the first switch and the port number of the first forwarding port, and learns that the first forwarding port is connected to the management port of the first switch in order to further control the first switch.

In a possible design, the first switch is configured to establish a TCP connection to the controller based on the IP address of the first switch carried in the first DHCP reply.

The controller is configured to generate a second flow table, and send the second flow table to the first switch, where the second flow table instructs to send a packet whose destination is the controller or the DHCP server through the second forwarding port. In addition, the controller sets a priority of the second flow table to be higher than that of the first preset flow table, or the controller instructs the first switch to delete the first preset flow table after receiving the second flow table.

Using the second flow table, when receiving a packet whose destination is the controller or the DHCP server, a forwarding plane of the second switch may match the packet with the second flow table, and send the packet to the controller or the DHCP server through the second forwarding port. Therefore, the second switch does not need to broadcast the packet through all the available forwarding ports, thereby improving packet processing efficiency.

In a possible design, a specific process of generating the second flow table is as follows.

The controller is configured to generate a second ARP probe flow table, where the second ARP probe flow table instructs to report, to the controller, an ARP type packet whose source IP address is an IP address of the controller, send the second ARP probe flow table to the first switch, generate a second ARP request, where a destination IP address of the second ARP request is the IP address of the controller, send the second ARP request to the first switch, and instruct the first switch to send the second ARP request through all the available forwarding ports of the first switch.

The first switch is configured to receive the second ARP probe flow table, and send the second ARP request to the controller through the second forwarding port.

The controller is configured to generate a second ARP reply based on the second ARP request, where a source IP address of the second ARP reply is the IP address of the controller, and send the second ARP reply to the first switch.

The first switch is configured to receive the second ARP reply using the second forwarding port, match the second ARP probe flow table with the second ARP reply, and report the second ARP reply and a port number of the second forwarding port based on the second ARP probe flow table.

The controller is configured to generate the second flow table based on the second ARP reply and the port number of the second forwarding port.

In the foregoing process, the controller learns the port number of the second forwarding port, and learns that the second forwarding port is connected to the controller or the DHCP server in order to further control the first switch.

In a possible design, a management port of the second switch is connected to the fifth forwarding port of the second switch. The controller further controls the first switch and the second switch. The control process is divided into three phases: learning the third forwarding port, learning the fourth forwarding port, and learning the fifth forwarding port.

In a possible design, the controller generates a third flow table, and sends the third flow table to the first switch, where the third flow table instructs to send a packet whose destination is the second switch through the third forwarding port.

Using the third flow table, when receiving a packet whose destination is the second switch, the forwarding plane of the first switch may match the packet with the third flow table, and send the packet to the second switch through the third forwarding port. Therefore, the first switch does not need to broadcast the packet through all the available forwarding ports, thereby improving packet processing efficiency.

In a possible design, a specific process of generating the third flow table is as follows.

The controller is configured to generate a first port probe flow table, where the first port probe flow table instructs to report a port reply packet to the controller, send the first port probe flow table to the first switch, generate a first port probe packet, and send the first port probe packet to the second switch using the first switch.

The second switch is configured to match a third preset flow table of the second switch with the first port probe packet, generate a first port reply packet based on the third preset flow table, and send the first port reply packet to the first switch.

In a possible design, a match field of the third preset flow table includes a source MAC address of a packet is a source MAC address of the first port probe packet. To avoid mismatching between the third preset flow table and another packet, the source MAC address of the first port probe packet may be specially set, for example, set to all 0s. An action field of the third preset flow table instructs to change the source MAC address of the first port probe packet to a MAC address of the second switch in order to generate the first port reply packet.

The first switch is configured to receive the first port reply packet through the third forwarding port, match the first port probe flow table with the first port reply packet, and report the first port reply packet and a port number of the third forwarding port based on the first port probe flow table.

The controller is configured to generate the third flow table based on the first port reply packet and the port number of the third forwarding port.

In the foregoing process, the controller learns the port number of the third forwarding port, and learns that the third forwarding port is connected to the second switch in order to further control the first switch.

In a possible design, the first switch receives a second DHCP request (the second DHCP request and the foregoing second DHCP request are two packets including same content), matches the second DHCP request with the second flow table, sends the second DHCP request to the DHCP server through the second forwarding port based on an action field of the second flow table, receives a second DHCP reply returned by the DHCP server, where a destination of the second DHCP reply is the second switch, the second DHCP reply carries the IP address of the second switch, and the second DHCP reply is generated by the DHCP server based on the second DHCP request, matches the second DHCP reply with the third flow table, and sends the second DHCP reply to the second switch through the third forwarding port.

The second switch is configured to receive the second DHCP reply, obtain the IP address of the second switch, and establish a TCP connection to the controller based on the IP address of the second switch.

After the first switch obtains the second flow table and the third flow table, a communication path between the second switch and the DHCP server is established. Therefore, the second switch may obtain the IP address of the second switch from the DHCP server, and establish the TCP connection to the controller based on the IP address of the second switch such that the second switch communicates with the controller in a subsequent process of generating a fourth flow table and a fifth flow table.

In a possible design, the controller generates the fourth flow table, and sends the fourth flow table to the second switch, where the fourth flow table instructs to send a packet whose destination is the second switch through the fifth forwarding port.

Using the fourth flow table, when receiving a packet whose destination is the second switch (that is, a control plane of the second switch), the forwarding plane of the second switch may match the packet with the fourth flow table, and send the packet to the management port of the second switch through the fifth forwarding port such that the packet enters the control plane of the second switch. Therefore, the second switch does not need to broadcast the packet through all the available forwarding ports, thereby improving packet processing efficiency.

In a possible design, a specific process of generating the fourth flow table is as follows.

The controller is configured to generate a third ARP probe flow table, where the third ARP probe flow table instructs to report, to the controller, an ARP type packet whose source IP address is the IP address of the second switch, send the third ARP probe flow table to the second switch, generate a third ARP request, where a destination IP address of the third ARP request is the IP address of the second switch, send the third ARP request to the second switch, and instruct the second switch to send the third ARP request through all available forwarding ports of the second switch.

The second switch is configured to receive the third ARP probe flow table, receive, using the management port of the second switch, the third ARP request sent through the fifth forwarding port, generate a third ARP reply based on the third ARP request, where a source IP address of the third ARP reply is the IP address of the second switch, send the third ARP reply to the fifth forwarding port using the management port of the second switch, match the third ARP probe flow table with the third ARP reply, and report the third ARP reply and a port number of the fifth forwarding port based on the third ARP probe flow table.

The controller is configured to generate the fourth flow table based on the third ARP reply and the port number of the fifth forwarding port.

In the foregoing process, the controller learns the port number of the fifth forwarding port, and learns that the fifth forwarding port is connected to the management port of the second switch in order to further control the second switch.

In a possible design, the controller generates the fifth flow table, and sends the fifth flow table to the second switch, where the fifth flow table instructs to send a packet whose destination is the controller or the DHCP server or the first switch through the fourth forwarding port.

Using the fifth flow table, when receiving a packet whose destination is the controller or the DHCP server, the forwarding plane of the second switch may match the packet with the fifth flow table, and send the packet through the fourth forwarding port. Therefore, the second switch does not need to broadcast the packet through all the available forwarding ports, thereby improving packet processing efficiency.

In a possible design, a specific process of generating the fifth flow table is as follows.

The controller is configured to generate a second port probe flow table, where the second port probe flow table instructs to report a port probe packet to the controller, send the second port probe flow table to the second switch, generate a second port probe packet, and send the second port probe packet to the second switch using the first switch. The second port probe packet carries the address information of the first switch such that the controller identifies a connection relationship between the fourth forwarding port and the first switch.

The second switch is configured to receive the second port probe packet using the fourth forwarding port, match the second port probe flow table with the second port probe packet, and report the second port probe packet and a port number of the fourth forwarding port based on the second port probe flow table.

The controller is configured to generate the fifth flow table based on the second port probe packet and the port number of the fourth forwarding port.

In the foregoing process, the controller learns the port number of the fourth forwarding port, and learns that the fourth forwarding port is connected to the first switch, the DHCP server, and the controller in order to further control the second switch.

A second aspect of this application provides a network. Different from the network provided in the first aspect, the controller and the DHCP server are disposed on different physical servers, the first switch is connected to the controller using the second forwarding port, and the first switch is connected to the DHCP server using the sixth forwarding port. After obtaining a first DHCP reply using a same method as that used in the network provided in the first aspect, the first switch establishes a TCP connection to the controller based on an IP address of the first switch carried in the first DHCP reply.

The controller is configured to generate a fourth ARP probe flow table, where the fourth ARP probe flow table instructs to report, to the controller, an ARP type packet whose source IP address is an IP address of the DHCP server, send the fourth ARP probe flow table to the first switch, generate a fourth ARP request, where a destination IP address of the fourth ARP request is the IP address of the DHCP server, send the fourth ARP request to the first switch, and instruct the first switch to send the fourth ARP request through all the available forwarding ports of the first switch.

The first switch is configured to receive the fourth ARP probe flow table and the fourth ARP request, send the fourth ARP request through all the available forwarding ports of the first switch, receive a fourth ARP reply from the sixth forwarding port, where a source IP address of the fourth ARP reply is the IP address of the DHCP server, and the fourth ARP reply is generated by the DHCP server based on the fourth ARP request, match the fourth ARP probe flow table with the fourth ARP reply, and report the fourth ARP reply and a port number of the sixth forwarding port based on the fourth ARP probe flow table.

The controller is configured to generate a sixth flow table based on the fourth ARP probe flow table and the port number of the sixth forwarding port, where the sixth flow table instructs to send a packet whose destination is the DHCP server through the sixth forwarding port, and send the sixth flow table to the first switch.

Because the DHCP server and the controller in the network access the first switch using different forwarding ports, in a controlled process of the first switch, the controller further needs to learn a connection relationship between the sixth forwarding port and the DHCP server such that the first switch can accurately forward a packet whose destination is the DHCP server, thereby improving packet forwarding efficiency.

In the network, identification of the first forwarding port by the controller (that is, generation of a first flow table), identification of the second forwarding port by the controller (that is, generation of a second flow table), identification of the third forwarding port by the controller (that is, generation of a third flow table), identification of the fifth forwarding port by the controller (that is, generation of a fourth flow table), and identification of the fourth forwarding port by the controller (that is, generation of a fifth flow table) are the same as those in the network provided in the first aspect.

A third aspect of this application provides a network management method, and the method is applied to the network provided in the first aspect. The method is a method performed by a controller side in the network provided in the first aspect.

The method includes generating, by the controller, a first ARP probe flow table, where the first ARP probe flow table instructs to report, to the controller, an ARP type packet whose source IP address is an IP address of a first switch, sending, by the controller, the first ARP probe flow table to the first switch, generating, by the controller, a first ARP request, where a destination IP address of the first ARP request is the IP address of the first switch, sending, by the controller, the first ARP request to the first switch, instructing, by the controller, the first switch to send the first ARP request through all available forwarding ports of the first switch, obtaining, by the controller, a first ARP reply and a port number of a first forwarding port that are reported by a forwarding plane of the first switch based on the first ARP probe flow table, where the first ARP reply is generated by a control plane of the first switch based on the first ARP request and sent to the forwarding plane of the first switch through the first forwarding port, and a source IP address of the first ARP reply is the IP address of the first switch, generating, by the controller, a first flow table based on the first ARP reply and the port number of the first forwarding port, where the first flow table instructs to send a packet whose destination is the first switch through the first forwarding port, and sending, by the controller, the first flow table to the first switch.

In a possible design, the method includes generating, by the controller, a second ARP probe flow table, where the second ARP probe flow table instructs to report, to the controller, an ARP type packet whose source IP address is an IP address of the controller, sending, by the controller, the second ARP probe flow table to the first switch, generating, by the controller, a second ARP request, where a destination IP address of the second ARP request is the IP address of the controller, sending, by the controller, the second ARP request to the first switch, instructing, by the controller, the first switch to send the second ARP request through all the available forwarding ports of the first switch, receiving, by the controller, the second ARP request sent by the first switch through a second forwarding port, generating, by the controller, a second ARP reply based on the second ARP request, where a source IP address of the second ARP reply is the IP address of the controller, sending, by the controller, the second ARP reply to the forwarding plane of the first switch through the second forwarding port, obtaining, by the controller, the second ARP reply and a port number of the second forwarding port that are reported by the forwarding plane of the first switch based on the second ARP probe flow table, generating, by the controller, a second flow table based on the second ARP reply and the port number of the second forwarding port, where the second flow table instructs to send a packet whose destination is the controller through the second forwarding port, and sending, by the controller, the second flow table to the first switch.

In a possible design, the method includes generating, by the controller, a first port probe flow table, where the first port probe flow table instructs to report a port reply packet to the controller, sending, by the controller, the first port probe flow table to the first switch, generating, by the controller, a first port probe packet, sending, by the controller, the first port probe packet to a second switch using the first switch, obtaining, by the controller, a first port reply packet and a port number of a third forwarding port that are reported by the forwarding plane of the first switch based on the first port probe flow table, where the first port reply packet is generated by a control plane of the second switch based on the first port probe packet and sent to the forwarding plane of the first switch through the third forwarding port, generating, by the controller, a third flow table based on the first port reply packet and the port number of the third forwarding port, where the third flow table instructs to send a packet whose destination is the second switch through the third forwarding port, and sending, by the controller, the third flow table to the first switch.

In a possible design, the second switch establishes a TCP connection to the controller, and the method includes generating, by the controller, a third ARP probe flow table, where the third ARP probe flow table instructs to report, to the controller, an ARP type packet whose source IP address is an IP address of the second switch, sending, by the controller, the third ARP probe flow table to the second switch, generating, by the controller, a third ARP request, where a destination IP address of the third ARP request is the IP address of the second switch, sending, by the controller, the third ARP request to the second switch, and instructing the second switch to send the third ARP request through all available forwarding ports of the second switch, obtaining, by the controller, a third ARP reply and a port number of a fifth forwarding port that are reported by a forwarding plane of the second switch based on the third ARP probe flow table, where the third ARP reply is generated by the control plane of the second switch based on the third ARP request and sent to the forwarding plane of the second switch through the fifth forwarding port, and a source IP address of the third ARP reply is the IP address of the second switch, generating, by the controller, a fourth flow table based on the third ARP reply and the port number of the fifth forwarding port, where the fourth flow table instructs to send a packet whose destination is the second switch through the fifth forwarding port, and sending, by the controller, the fourth flow table to the second switch.

In a possible design, the method includes generating, by the controller, a second port probe flow table, where the second port probe flow table instructs to report a port probe packet to the controller, sending, by the controller, the second port probe flow table to the second switch, generating, by the controller, a second port probe packet, sending, by the controller, the second port probe packet to the forwarding plane of the second switch through a fourth forwarding port of the second switch, obtaining, by the controller, the second port probe packet and a port number of the fourth forwarding port that are reported by the forwarding plane of the second switch based on the second port probe flow table, generating, by the controller, a fifth flow table based on the second port probe packet and the port number of the fourth forwarding port, where the fifth flow table instructs to send a packet whose destination is the first switch or the controller through the fourth forwarding port, and sending, by the controller, the fifth flow table to the second switch.

A fourth aspect of this application provides a network management method, and the method is applied to the network provided in the second aspect. The method is a method performed by a controller side in the network provided in the second aspect.

The method includes generating, by the controller, a fourth ARP probe flow table, where the fourth ARP probe flow table instructs to report, to the controller, an ARP type packet whose source IP address is an IP address of the DHCP server, sending, by the controller, the fourth ARP probe flow table to a first switch, generating, by the controller, a fourth ARP request, where a destination IP address of the fourth ARP request is the IP address of the DHCP server, sending, by the controller, the fourth ARP request to the first switch, instructing, by the controller, the first switch to send the fourth ARP request through all the available forwarding ports of the first switch, obtaining, by the controller, a fourth ARP reply and a port number of a sixth forwarding port that are reported by the forwarding plane of the first switch based on the fourth ARP probe flow table, where the fourth ARP reply is generated by the DHCP server based on the fourth ARP request and sent to the forwarding plane of the first switch through the sixth forwarding port of the first switch, and a source IP address of the fourth ARP reply is the IP address of the DHCP server, generating, by the controller, a sixth flow table based on the fourth ARP reply and the port number of the sixth forwarding port, where the sixth flow table instructs to send a packet whose destination is the DHCP server through the sixth forwarding port, and sending, by the controller, the sixth flow table to the first switch.

In the network management method provided in this aspect, identification of the first forwarding port by the controller (that is, generation of a first flow table), identification of the second forwarding port by the controller (that is, generation of a second flow table), identification of the third forwarding port by the controller (that is, generation of a third flow table), identification of the fifth forwarding port by the controller (that is, generation of a fourth flow table), and identification of the fourth forwarding port by the controller (that is, generation of a fifth flow table) are the same as those in the method provided in the third aspect.

A fifth aspect of this application provides a controller, including a processor and a memory, where the processor establishes communication with the memory, and the processor is configured to perform the method provided in any one of the third aspect or the possible designs of the third aspect.

A sixth aspect of this application provides a controller, including a processor and a memory, where the processor establishes communication with the memory, and the processor is configured to perform the method provided in the fourth aspect.

A seventh aspect of this application provides a switch management method, and the management method is performed by the first switch in the network provided in the first aspect. The method includes generating, by a control plane of the first switch, a first DHCP request, and sending the first DHCP request to a forwarding plane of the first switch through a management port of the first switch, matching, by the forwarding plane of the first switch, a first preset flow table with the first DHCP request, sending, by the forwarding plane of the first switch, the first DHCP request through all available forwarding ports of the first switch based on the first preset flow table, receiving, by the forwarding plane of the first switch, a first DHCP reply, where the DHCP reply is generated by a DHCP server based on the first DHCP request, matching, by the forwarding plane of the first switch, a second preset flow table with the first DHCP reply, sending, by the forwarding plane of the first switch, the first DHCP reply through all the available forwarding ports of the first switch based on the second preset flow table, receiving, by the control plane of the first switch using the management port of the first switch, the first DHCP reply sent through a first forwarding port, receiving, by the forwarding plane of the first switch from the third port, a second DHCP request sent by the second switch, determining, by the forwarding plane of the first switch, that the second DHCP request cannot match the first preset flow table or the second preset flow table, and discarding, by the forwarding plane of the first switch, the second DHCP request.

In a possible design, the method includes receiving, by the forwarding plane of the first switch, a first ARP probe flow table from a controller, where the first ARP probe flow table instructs to report, to the controller, an ARP type packet whose source IP address is an IP address of the first switch carried in the first DHCP reply, receiving, by the forwarding plane of the first switch, a first ARP request from the controller, where a destination IP address of the first ARP request is the IP address of the first switch, sending, by the forwarding plane of the first switch, the first ARP request through all the available forwarding ports of the first switch based on an instruction of the controller, receiving, by the control plane of the first switch using the management port of the first switch, the first ARP request sent through the first forwarding port, generating, by the control plane of the first switch, a first ARP reply based on the first ARP request, where a source IP address of the first ARP reply is the IP address of the first switch, sending, by the control plane of the first switch, the first ARP reply to the forwarding plane of the first switch through the first forwarding port, matching, by the forwarding plane of the first switch, the first ARP probe flow table with the first ARP reply, reporting, by the forwarding plane of the first switch, the first ARP reply and a port number of the first forwarding port to the controller based on the first ARP probe flow table, and receiving, by the forwarding plane of the first switch, a first flow table from the controller, where the first flow table instructs to send a packet whose destination is the first switch through the first forwarding port, and a priority of the first flow table is higher than that of the second preset flow table or the first switch deletes the second preset flow table after receiving the first flow table.

In a possible design, the method includes receiving, by the forwarding plane of the first switch, a second ARP probe flow table from the controller, where the second ARP probe flow table instructs to report, to the controller, an ARP type packet whose source IP address is an IP address of the controller, receiving, by the forwarding plane of the first switch, a second ARP request from the controller, where a destination IP address of the second ARP request is the IP address of the controller, sending, by the forwarding plane of the first switch, the second ARP request through all the available forwarding ports of the first switch based on an instruction of the controller, receiving, by the forwarding plane of the first switch, a second ARP reply through a second forwarding port, where the second ARP reply is generated by the controller based on the second ARP request, and a source IP address of the second ARP reply is the IP address of the controller, reporting, by the forwarding plane of the first switch, the second ARP reply and a port number of the second forwarding port based on the second ARP probe flow table, and receiving, by the forwarding plane of the first switch, a second flow table from the controller, where the second flow table instructs to send a packet whose destination is the controller or the DHCP server through the second forwarding port, and a priority of the second flow table is higher than that of the first preset flow table or the first switch deletes the first preset flow table after receiving the first flow table.

In a possible design, the method includes receiving, by the forwarding plane of the first switch, a first port probe flow table from the controller, where the first port probe flow table instructs to report a port reply packet to the controller, receiving, by the forwarding plane of the first switch, a first port probe packet from the controller, and sending the first port probe packet to the second switch, receiving, by the forwarding plane of the first switch through a third forwarding port, a first port reply packet generated by the second switch based on the first port probe packet, reporting, by the forwarding plane of the first switch, the first port reply packet and a port number of the third forwarding port to the controller based on the first port probe flow table, and receiving, by the forwarding plane of the first switch, a third flow table from the controller, where the third flow table instructs to send a packet whose destination is the second switch through the third forwarding port.

An eighth aspect of this application provides a switch management method, and the method is performed by the first switch in the network provided in the second aspect. The method includes receiving, by a forwarding plane of the first switch, a fourth ARP probe flow table from a controller, where the fourth ARP probe flow table instructs to report, to the controller, an ARP type packet whose source IP address is an IP address of the DHCP server, receiving, by the forwarding plane of the first switch, a fourth ARP request from the controller, where a destination IP address of the fourth ARP request is the IP address of the DHCP server, sending, by the forwarding plane of the first switch, the fourth ARP request to the DHCP server through the sixth forwarding port, receiving, by the forwarding plane of the first switch, a fourth ARP reply through the sixth forwarding port, where the fourth ARP reply is generated by the DHCP server based on the fourth ARP request, and a source IP address of the fourth ARP reply is the IP address of the DHCP server, reporting, by the forwarding plane of the first switch, the fourth ARP reply and a port number of the sixth forwarding port to the controller based on the fourth ARP probe flow table, and receiving, by the forwarding plane of the first switch, a sixth flow table from the controller, where the sixth flow table instructs to send a packet whose destination is the DHCP server through the sixth forwarding port.

In the switch management method provided in this aspect, obtaining of a first flow table, obtaining of a second flow table, obtaining of a third flow table, obtaining of a fourth flow table, and obtaining of a fifth flow table are the same as those in the method provided in the seventh aspect.

A ninth aspect of this application provides a switch, including a processor and a memory, where the processor establishes communication with the memory, and the processor is configured to perform the method provided in any one of the seventh aspect or the possible designs of the seventh aspect.

A tenth aspect of this application provides a switch, including a processor and a memory, where the processor establishes communication with the memory, and the processor is configured to perform the method provided in the eighth aspect.

An eleventh aspect of this application provides a switch management method, and the management method is performed by the second switch in the network provided in the first aspect or the network provided in the second aspect. The second switch establishes a TCP connection to a controller.

The method includes receiving, by a forwarding plane of the second switch, a second port probe flow table from the controller, where the second port probe flow table instructs to report a port probe packet to the controller, receiving, by the forwarding plane of the second switch through the fourth forwarding port, a second port probe packet that is from the controller and that is sent by the first switch, reporting, by the forwarding plane of the second switch, the second port probe packet and a port number of the fourth forwarding port to the controller based on the second port probe flow table, and receiving, by the forwarding plane of the second switch, a fifth flow table from the controller, where the fifth flow table instructs to send a packet whose destination is the first switch or the controller through the fourth forwarding port.

In a possible design, the forwarding plane of the second switch receives a third ARP probe flow table from the controller, where the third ARP probe flow table instructs to report, to the controller, an ARP type packet whose source IP address is an IP address of the second switch, the forwarding plane of the second switch receives a third ARP request from the controller, where a destination IP address of the third ARP request is the IP address of the second switch, the forwarding plane of the second switch sends the third ARP request through all available forwarding ports of the second switch based on an instruction, a control plane of the second switch receives, using a management port of the second switch, the third ARP request sent through the fifth forwarding port, the control plane of the second switch generates a third ARP reply based on the third ARP request, where a source IP address of the third ARP reply is the IP address of the second switch, the control plane of the second switch sends the third ARP reply to the forwarding plane of the second switch through the fifth forwarding port, the forwarding plane of the second switch matches the third ARP probe flow table with the third ARP reply, the forwarding plane of the third switch reports the third ARP reply and a port number of the fifth forwarding port to the controller based on the third ARP probe flow table, and the forwarding plane of the third switch receives a third flow table from the controller, where the third flow table instructs to send a packet whose destination is the second switch through the fifth forwarding port.

In a possible design, the method further includes receiving, by the forwarding plane of the second switch, a first port probe packet from the controller, matching, by the forwarding plane of the second switch, the first port probe packet with a third preset flow table, and changing a source MAC address of the first port probe packet to a MAC address of the second switch based on the third preset flow table in order to generate a first port reply packet, and sending, by the second switch, the first port reply packet to the third forwarding port of the first switch.

A twelfth aspect of this application provides a switch, including a processor and a memory, where the processor establishes communication with the memory, and the processor is configured to perform the method provided in the eleventh aspect.

A thirteenth aspect of this application provides a storage medium, where the storage medium stores a program, and when the program is run by a controller, the controller performs the method provided in any one of the third aspect or the possible designs of the third aspect. The storage medium and storage media provided in the following aspects include but are not limited to a read-only memory (ROM), a random-access memory (RAM), a flash memory, a hard disk drive (HDD), or a solid state drive (SSD).

A fourteenth aspect of this application provides a storage medium, where the storage medium stores a program, and when the program is run by a controller, the controller performs the method provided in the fourth aspect.

A fifteenth aspect of this application provides a storage medium, where the storage medium stores a program, and when the program is run by a first switch, the first switch performs the method provided in any one of the seventh aspect or the possible designs of the seventh aspect.

A sixteenth aspect of this application provides a storage medium, where the storage medium stores a program, and when the program is run by a first switch, the first switch performs the method provided in the eighth aspect.

A seventeenth aspect of this application provides a storage medium, where the storage medium stores a program, and when the program is run by a second switch, the second switch performs the method provided in any one of the eleventh aspect or the possible designs of the eleventh aspect.

An eighteenth aspect of this application provides a computer program product, where the computer program product includes a program instruction, and when the computer program product is executed by a controller, the controller performs the method provided in any one of the third aspect or the possible designs of the third aspect. The computer program product may be a software installation package. When the method provided in any one of the third aspect or the possible designs of the third aspect needs to be used, the computer program product may be downloaded and executed on the controller.

A nineteenth aspect of this application provides a computer program product, where the computer program product includes a program instruction, and when the computer program product is executed by a controller, the controller performs the method provided in the fourth aspect. The computer program product may be a software installation package. If the method provided in the fourth aspect needs to be used, the computer program product may be downloaded and executed on the controller.

A twentieth aspect of this application provides a computer program product, where the computer program product includes a program instruction, and when the computer program product is executed by a first switch, the first switch performs the method provided in any one of the seventh aspect or the possible designs of the seventh aspect. The computer program product may be a software installation package. When the method provided in any one of the seventh aspect or the possible designs of the seventh aspect needs to be used, the computer program product may be downloaded and executed on the first switch.

A twenty-first aspect of this application provides a computer program product, where the computer program product includes a program instruction, and when the computer program product is executed by a first switch, the controller performs the method provided in the eighth aspect. The computer program product may be a software installation package. When the method provided in the eighth aspect needs to be used, the computer program product may be downloaded and executed on the first switch.

A twenty-second aspect of this application provides a computer program product, where the computer program product includes a program instruction, and when the computer program product is executed by a second switch, the second switch performs the method provided in the eleventh aspect. The computer program product may be a software installation package. When the method provided in the eleventh aspect needs to be used, the computer program product may be downloaded and executed on the second switch.

A twenty-third aspect of this application provides a storage medium, where the storage medium stores the first preset flow table described in the foregoing aspects. A match field of the first preset flow table includes a source MAC address of a packet is a MAC address of a first switch. An action field of the first preset flow table includes performing sending through all available forwarding ports of the first switch.

A twenty-fourth aspect of this application provides a computer program product, where the computer program product includes a program instruction, and the program instruction is used to implement the first preset flow table described in the foregoing aspects.

A twenty-fifth aspect of this application provides a storage medium, where the storage medium stores the second preset flow table described in the foregoing aspects. A match field of the second preset flow table includes a destination MAC address of a packet=a MAC address of a first switch. An action field of the second preset flow table includes performing sending through all available forwarding ports of the first switch.

A twenty-sixth aspect of this application provides a computer program product, where the computer program product includes a program instruction, and the program instruction is used to implement the second preset flow table described in the foregoing aspects.

A twenty-seventh aspect of this application provides a storage medium, where the storage medium stores the third preset flow table described in the foregoing aspects. A match field of the third preset flow table includes a packet type=Link Layer Discovery Protocol (LLDP), and a source MAC address of a packet is a source MAC address of a first port probe packet. The source MAC address of the first port probe packet may be all 0s. An action field of the third preset flow table includes changing the source MAC address of the packet to a MAC address of a second switch, and sending the changed packet through an inport port for the first port probe packet.

A twenty-eighth aspect of this application provides a computer program product, where the computer program product includes a program instruction, and the program instruction is used to implement the third preset flow table described in the foregoing aspects.

A twenty-ninth aspect of this application provides a network, including a first switch, a second switch, and a controller. A first forwarding port of the first switch is connected to a management port of the first switch. A second forwarding port of the first switch is connected to the controller. A third forwarding port of the first switch is connected to a fourth forwarding port of the second switch. A seventh forwarding port of the second switch is connected to a DHCP server.

The first switch is configured to generate a first DHCP request, match the first DHCP request with a first preset flow table, and send the first DHCP request through all available forwarding ports of the first switch based on the first preset flow table.

The second switch is configured to receive the first DHCP request through the fourth forwarding port, match the first DHCP request with a fourth preset flow table, send the first DHCP request through all available forwarding ports of the second switch based on the fourth preset flow table, receive a first DHCP reply, where the first DHCP reply is generated by the DHCP server based on the first DHCP request, match the first DHCP reply with a fifth preset flow table, and send the first DHCP reply through all the available forwarding ports of the second switch based on the fifth preset flow table, where a match field of the fourth preset flow table includes a source MAC address of a packet=a MAC address of the first switch, a match field of the fifth preset flow table includes a destination MAC address of a packet=the MAC address of the first switch, and both an action field of the fourth preset flow table and an action field of the fifth preset flow table include performing sending through all the available forwarding ports of the second switch.

The first switch is configured to receive the first DHCP reply, match a second preset flow table of the first switch with the first DHCP reply, and send the first DHCP request through all the available forwarding ports of the first switch based on the second preset flow table.

In the network, identification of the first forwarding port by the controller (that is, generation of a first flow table), identification of the second forwarding port by the controller (that is, generation of a second flow table), identification of the third forwarding port by the controller (that is, generation of a third flow table), identification of a fifth forwarding port by the controller (that is, generation of a fourth flow table), and identification of the fourth forwarding port by the controller (that is, generation of a fifth flow table) are the same as those in the network provided in the first aspect.

In a boot process of the network provided above, the first switch can obtain an IP address allocated to the first switch, and partial control on the first switch is implemented.

BRIEF DESCRIPTION OF DRAWINGS

To describe the technical solutions in some of the embodiments of this application more clearly, the following briefly describes the accompanying drawings describing some of the embodiments.

DESCRIPTION OF EMBODIMENTS

Figure 1:
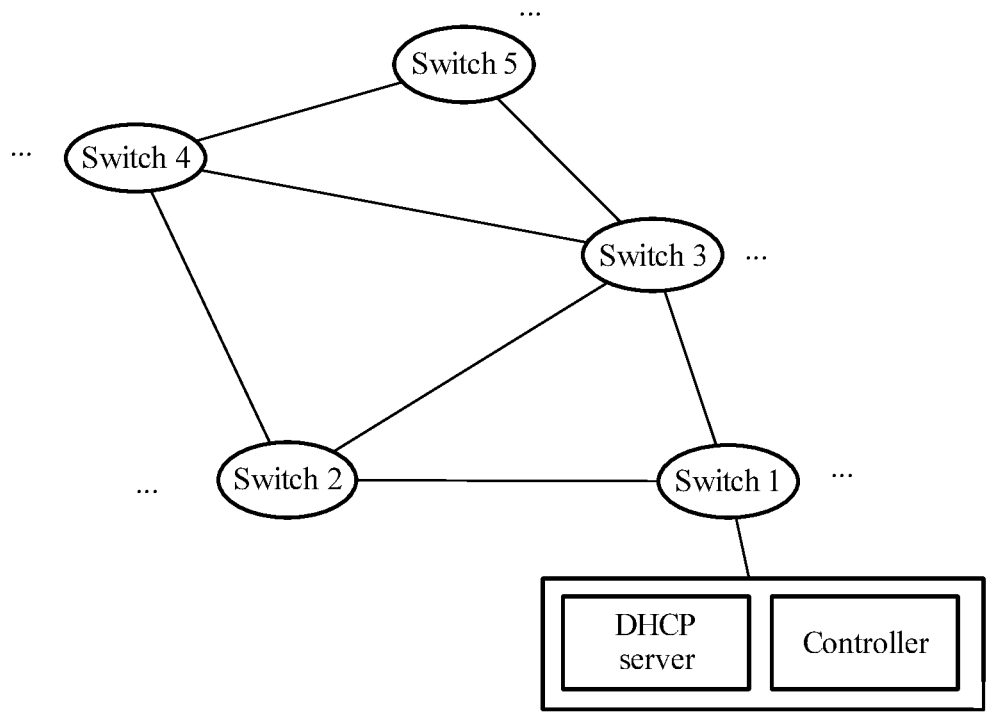
FIG. 1 is a schematic diagram of a network architecture according to this application.

The following describes the technical solutions in some of the embodiments of this application with reference to the accompanying drawings in the embodiments of this application.

In this application, there is no logical or temporal dependency relationship between "first", "second", and "$n^{th}$".

In this specification, a switch is a device that implements packet routing under control of a controller. For example, the switch may process a packet based on a flow table delivered by the controller. For example, the switch may support the OPENFLOW protocol.

The switch may be implemented by running software on a server, or may be implemented using an integrated circuit, or may be implemented using a combination of a server and an integrated circuit. The integrated circuit may be an application-specific integrated circuit (ASIC), a programmable logic device (PLD), or a network processing unit. The foregoing PLD may be a complex PLD (CPLD), a field-programmable gate array (FPGA), or generic array logic (GAL).

In this specification, "connection" refers to direct connections between adjacent switches, between a switch and the controller, and between a switch and a DHCP server in which no other devices are disposed, or indirect connections between adjacent switches, between a switch and the controller, and between a switch and a DHCP server that are implemented using other devices.

The flow table in this specification is a packet processing rule for execution by the switch. Each packet processing rule includes a matching part and an execution part. If a packet can match a matching part of a packet processing rule, the switch processes the packet based on an execution part of the packet processing rule. A match field and an execution field that are used in this specification are an implementation of a packet processing rule, a match field is also referred to as a matching part, and an execution field is also referred to as an execution part. A format and a name of a flow table are not limited in this specification.

In this specification, the controller is a device that controls the switch. For example, the controller may send a flow table to the switch, and control an action of the switch using the flow table. For example, the controller may communicate with the switch using the OPENFLOW protocol. The controller may send, to the switch, content used to generate a flow table such that the switch generates the corresponding flow table based on the content. The controller may be a software-defined network controller, a network management device, or the like.

The controller may be implemented in a centralized manner, for example, implemented using one physical server, or may be implemented in a distributed manner, for example, implemented using a plurality of physical servers. The controller and the DHCP server may be located on a same physical server. For example, the controller and the DHCP server run on two different virtual machines on a same physical server. The controller and the DHCP server may alternatively be located on different physical servers.

In this specification, a physical server is a computing device configured to execute one or more software programs. There are various types of physical servers, such as a rack server, a tower server, and a blade server. The physical server may serve as a DHCP server or a controller. That is, software supporting a DHCP service and software supporting a controller run on the physical server. When software supporting a DHCP service and software supporting a controller are deployed on a physical server, the physical server is both a DHCP server and a controller. A service server is configured to run a service.

Network Architecture:

FIG. 1 shows a network architecture according to an embodiment of this application. In this embodiment, a controller and a DHCP server run on a same server. The server is connected to a switch 1, and other switches in the network need to use the switch 1 to communicate with the DHCP server or the controller. FIG. 1 shows only some switches. The switch 1, a switch 2, a switch 3, a switch 4, and a switch 5 may be further connected to other switches.

Figure 2A:
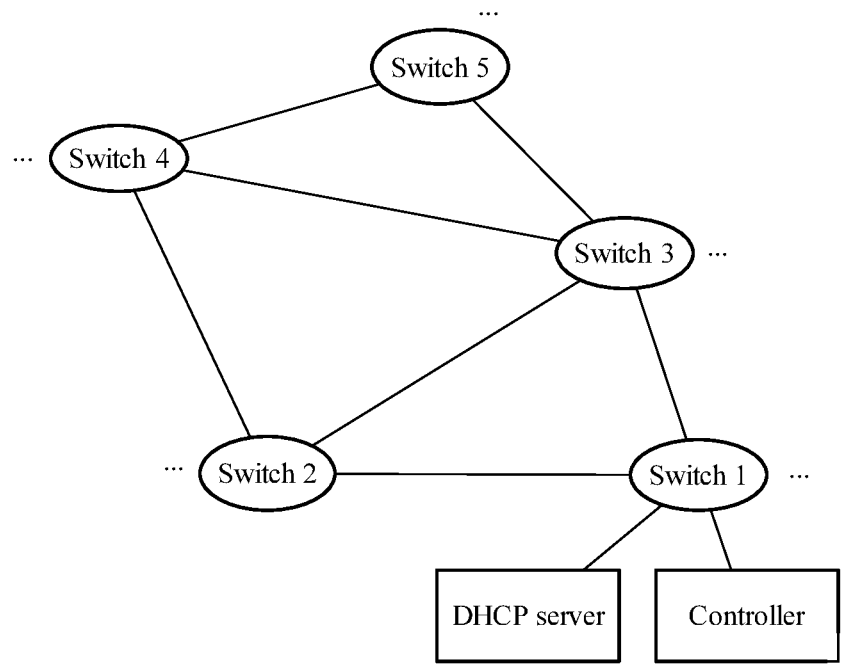
FIG. 2A is a schematic diagram of a network architecture according to this application.

FIG. 2A shows another network architecture according to an embodiment of this application. In this embodiment, a controller and a DHCP server run on different servers, both the controller and the DHCP server are connected to a switch 1, and other switches in the network need to use the switch 1 to communicate with the DHCP server and the controller.

Figure 2B:
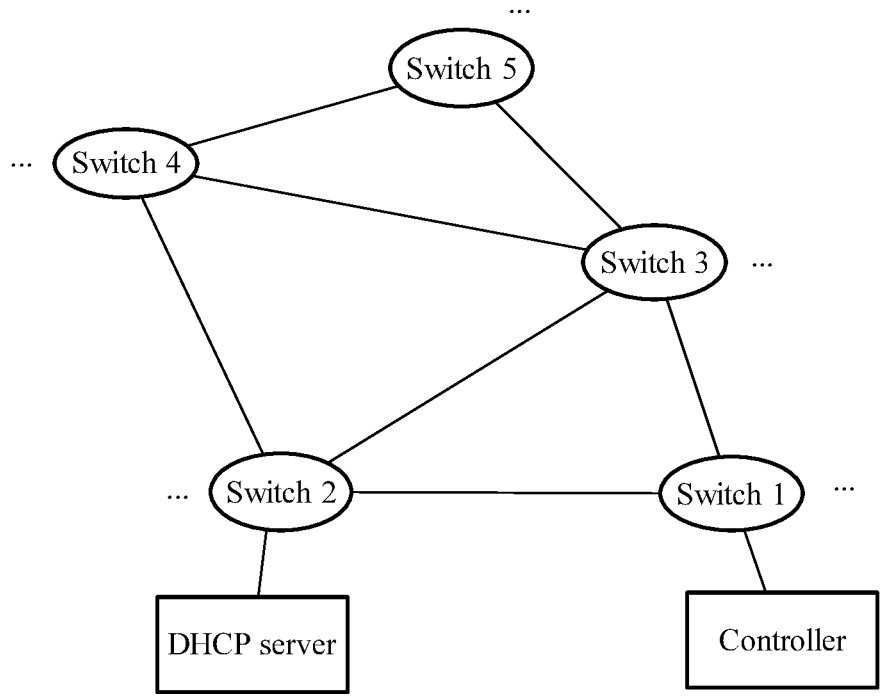
FIG. 2B is a schematic diagram of a network architecture according to this application.

FIG. 2B shows another network architecture according to an embodiment of this application. In this embodiment, a controller and a DHCP server run on two different servers, and the two servers are connected to different switches. For example, in this embodiment, the controller is connected to a switch 1, and the DHCP server is connected to a switch 2. Other switches in the network need to use the switch 1 to communicate with the controller. Other switches in the network need to use the switch 2 to communicate with the DHCP server.

Figure 3:
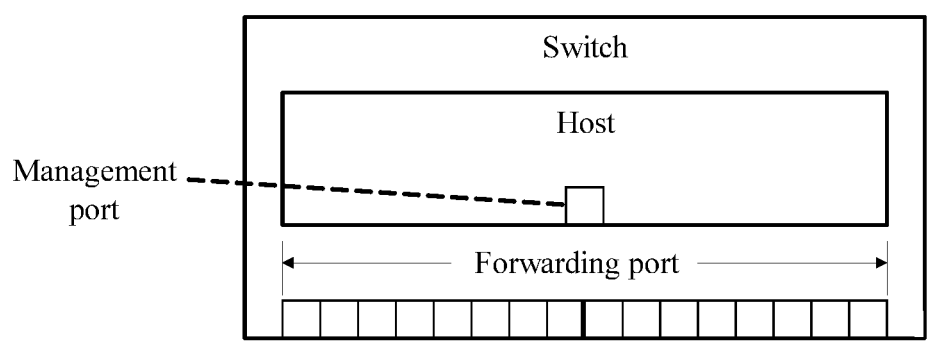
FIG. 3 is a schematic structural diagram of a switch according to this application.

Switch Structure:

FIG. 3 is a schematic structural diagram of a switch according to an embodiment of this application. In this embodiment, the switch includes a host, and the host has a MAC address, that is, a MAC address of the switch. The host communicates with a controller using a management port. The management port of the host is connected to at least one forwarding port of the switch. A packet sent by the management port is sent to another switch, a DHCP server, or the controller through a forwarding port. A packet that is sent by another switch, the DHCP server, or the controller and whose destination is the host of the switch is sent to the management port through a forwarding port of the switch, and then sent to the host of the switch.

Figure 4A:
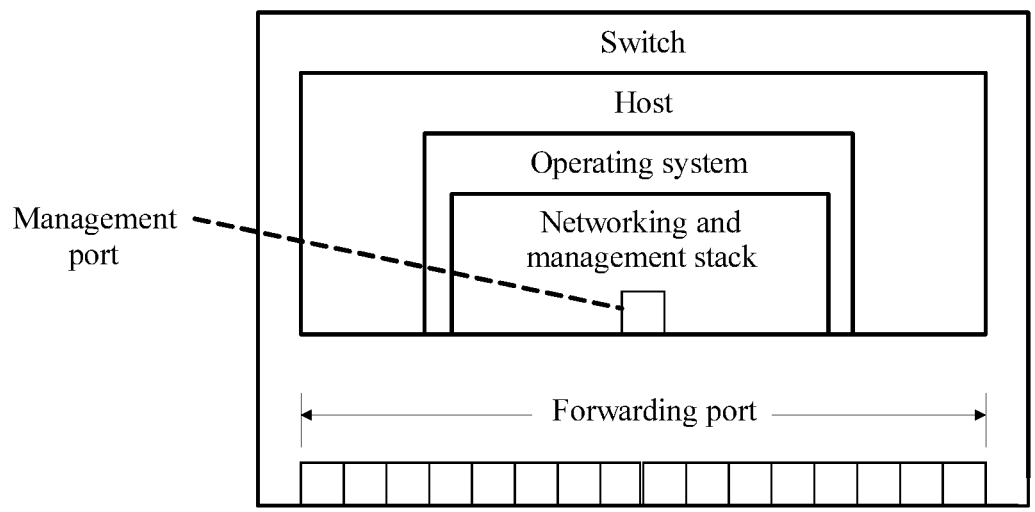
FIG. 4A is a schematic diagram of an internal structure of a switch according to this application.

The management port may be a hardware port or a logical port. FIG. 4A is a schematic diagram of an internal structure of a switch according to an embodiment of the present disclosure. In this embodiment, an operating system runs on a host of the switch, and the operating system includes a networking and management stack. The operating system is connected to a forwarding port of the switch using a management port of the networking and management stack, and the management port is also referred to as a local port.

Figure 4B:
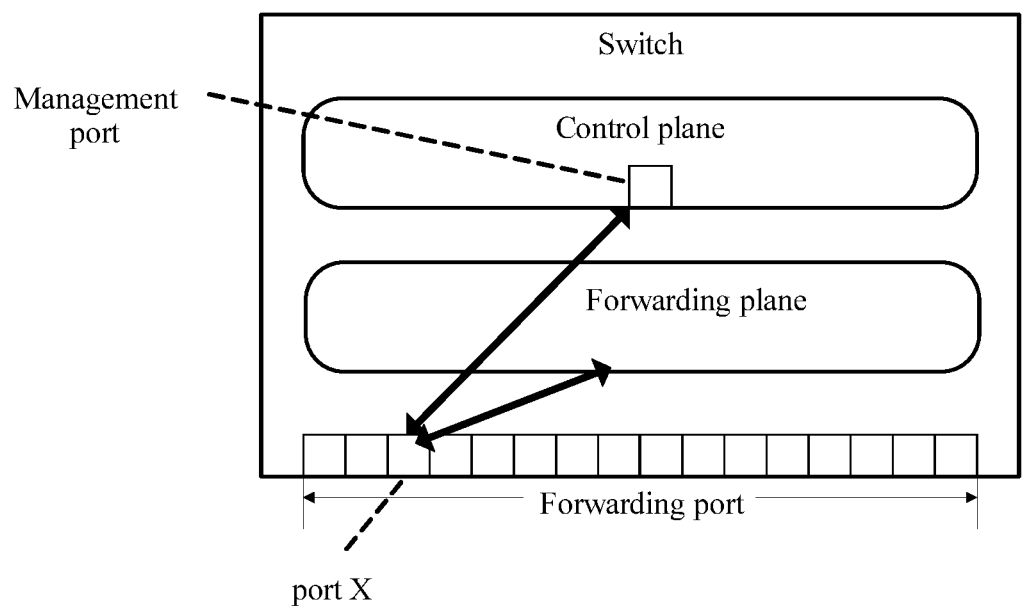
FIG. 4B is a schematic diagram of an internal structure of a switch according to this application.

FIG. 4B is a schematic diagram of an internal structure of a switch according to an embodiment of the present disclosure. In this embodiment, the switch includes a control plane and a forwarding plane. A host supports operation of the control plane. The control plane is responsible for managing the switch, including initiating a DHCP request, generating a DHCP reply, generating an ARP reply, generating a port reply packet, receiving content that is used to generate a flow table and that is sent by a controller, generating the corresponding flow table based on the content, and storing the corresponding flow table in the forwarding plane, and the like. The forwarding plane is responsible for receiving a packet, sending a packet, matching a packet with a flow table, processing a matched packet, and the like.

Figure 5:
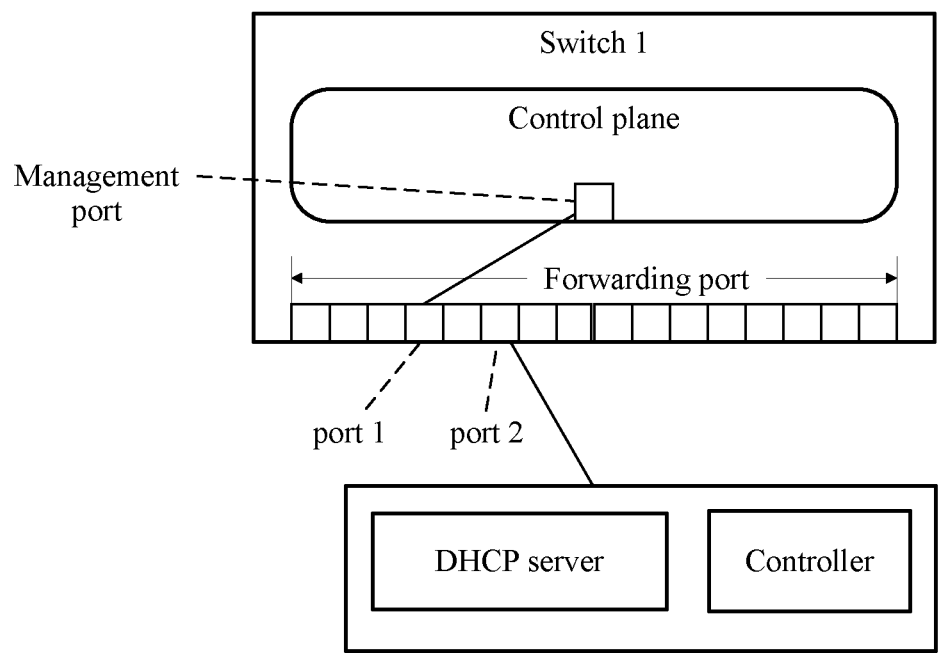
FIG. 5 is a schematic diagram of a connection relationship between a switch, a controller, and a DHCP server according to this application.

The forwarding plane of the switch can perform a reporting action on a packet, and the reporting action includes sending the packet and an inport port of the packet to the controller. The inport port of the packet is a forwarding port used when the packet enters the forwarding plane of the switch. FIG. 5 is used as an example. After a control plane of a switch 1 sends a packet A to a forwarding plane of the switch 1 using a port 1, if the forwarding plane of the switch 1 reports the packet A, the port 1 is also reported to a controller. After the switch 1 receives, using a port 2, a packet B sent by the controller/a DHCP server, if the forwarding plane of the switch 1 reports the packet B, the port 2 is also reported to the controller.

The control plane is connected to a forwarding port using a management port, and the forwarding plane is connected to the forwarding port. Therefore, the control plane communicates with the forwarding plane using the forwarding port. For example, the management port of the switch communicates with the forwarding plane using a port X as shown in FIG. 4B. If a packet is sent to a forwarding port of the switch, after the packet enters the forwarding plane of the switch through the forwarding port, if the packet needs to be sent to the control plane, the forwarding plane needs to send the packet to the management port through the port X. The packet may be a DHCP request, an ARP request, or a port probe packet. After the control plane receives the packet from the management port and generates, based on the packet, a corresponding reply packet, for example, a DHCP reply, an ARP reply, or a port probe reply, the control plane sends the reply packet from the management port, sends the reply packet to the forwarding plane through the port X, and then sends the reply packet to the outside using the forwarding plane.

After a switch in a network is started, the switch requests the DHCP server to allocate an IP address. In this case, because the controller knows neither a connection relationship between switches nor address information of the switches, the controller cannot deliver, to each switch, a flow table for accurately controlling a DHCP request flow direction.

In view of this, a method in other approaches is that each switch sends a received DHCP request through all forwarding ports. For example, in the foregoing network architecture, the switch 4 generates a DHCP request, and sends the DHCP request to all switches connected to the switch 4, including the switch 2, the switch 3, and the switch 5. After receiving the DHCP request, the switch 5 sends the DHCP request to all switches connected to the switch 5, including the switch 3 and the switch 4. The DHCP requests form a broadcast storm in the network, and cause great pressure on the network.

Therefore, in the solution provided in this application, a flow table is set in a switch. This setting is completed before the switch or the controller initiates a DHCP request. For example, a flow table may be pre-stored in each switch, and it is set that the flow table is loaded when the switch is started. A process of the setting may be performed by management personnel before a controlled procedure of the switch starts. The management personnel designs corresponding preset flow tables for all switches based on different MAC addresses of the switches, and stores the designed preset flow tables in memories of the switches.

As shown in Table 1, a first preset flow table and a second preset flow table are set in each switch in the network.

TABLE 1

| | Content |
|---|---|
| First preset flow table | Match field: source MAC address of a packet = MAC address of the switch<br>Action field: performing sending through all available forwarding ports of the switch |
| Second preset flow table | Match field: destination MAC address of a packet = MAC address of the switch<br>Action field: performing sending through all available forwarding ports of the switch |

A match field of a first preset flow table that is set in a switch includes a source MAC address of a packet=a MAC address of the switch. A match field of a second preset flow table that is set in the switch includes a destination MAC address of a packet=the MAC address of the switch. Because MAC addresses of all switches are different, first preset flow tables that are set by different switches are different, and match fields of second preset flow tables that are set in different switches are also different. Available forwarding ports in an action field of a preset flow table may be some of forwarding ports of a switch. An available forwarding port may be a forwarding port used in a network boot process. All of ports 1 to 7 mentioned in this specification are available forwarding ports. For example, some forwarding ports may be reserved in a switch and are not used in a controlled process of the switch. In this case, a packet does not need to be sent through the reserved forwarding ports in an action field of a preset flow table.

Figure 7:
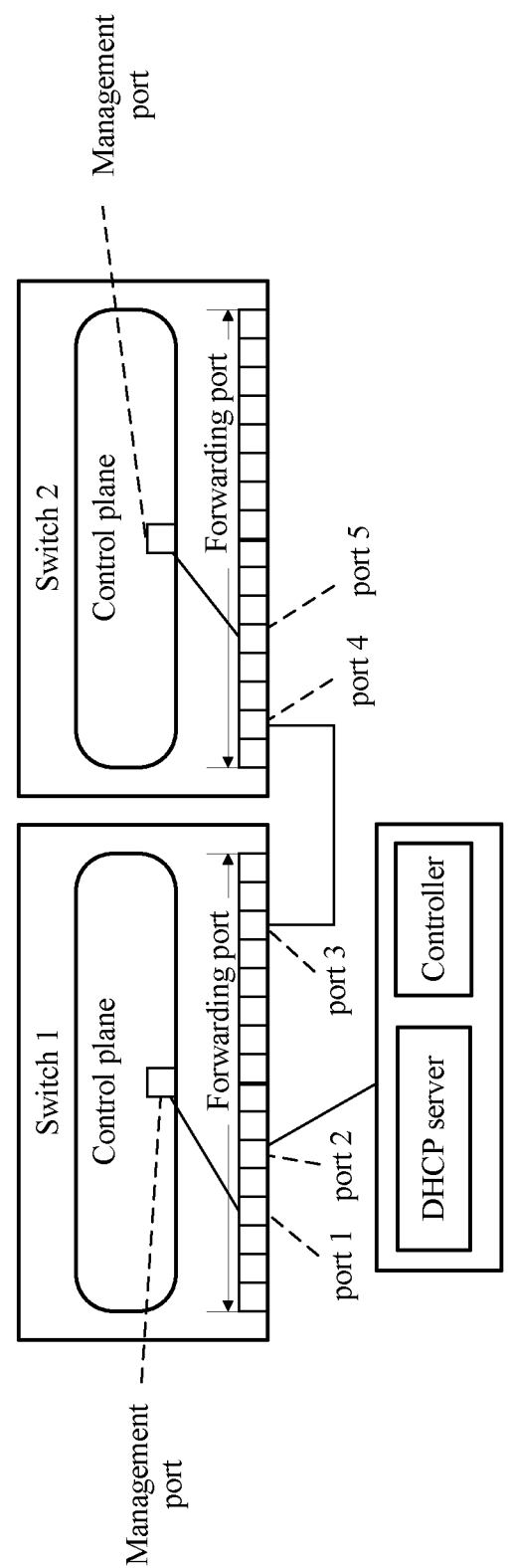
FIG. 7 is a schematic diagram of a connection relationship between a switch, a controller, and a DHCP server according to this application.

In the network architecture shown in FIG. 1, an example in which a forwarding port, connected to a management port, in the switch 1 is a port 1, and the switch 1 establishes a connection to the DHCP server and the controller using a port 2 is used as an example. For example, a port connection manner shown in FIG. 5 is used. The network may further include a switch 2, and the switch 2 is connected to a port 3 of the switch 1 using a port 4. A management port of the switch 2 is connected to a port 5 of the switch 2, as shown in FIG. 7.

Figure 6A:
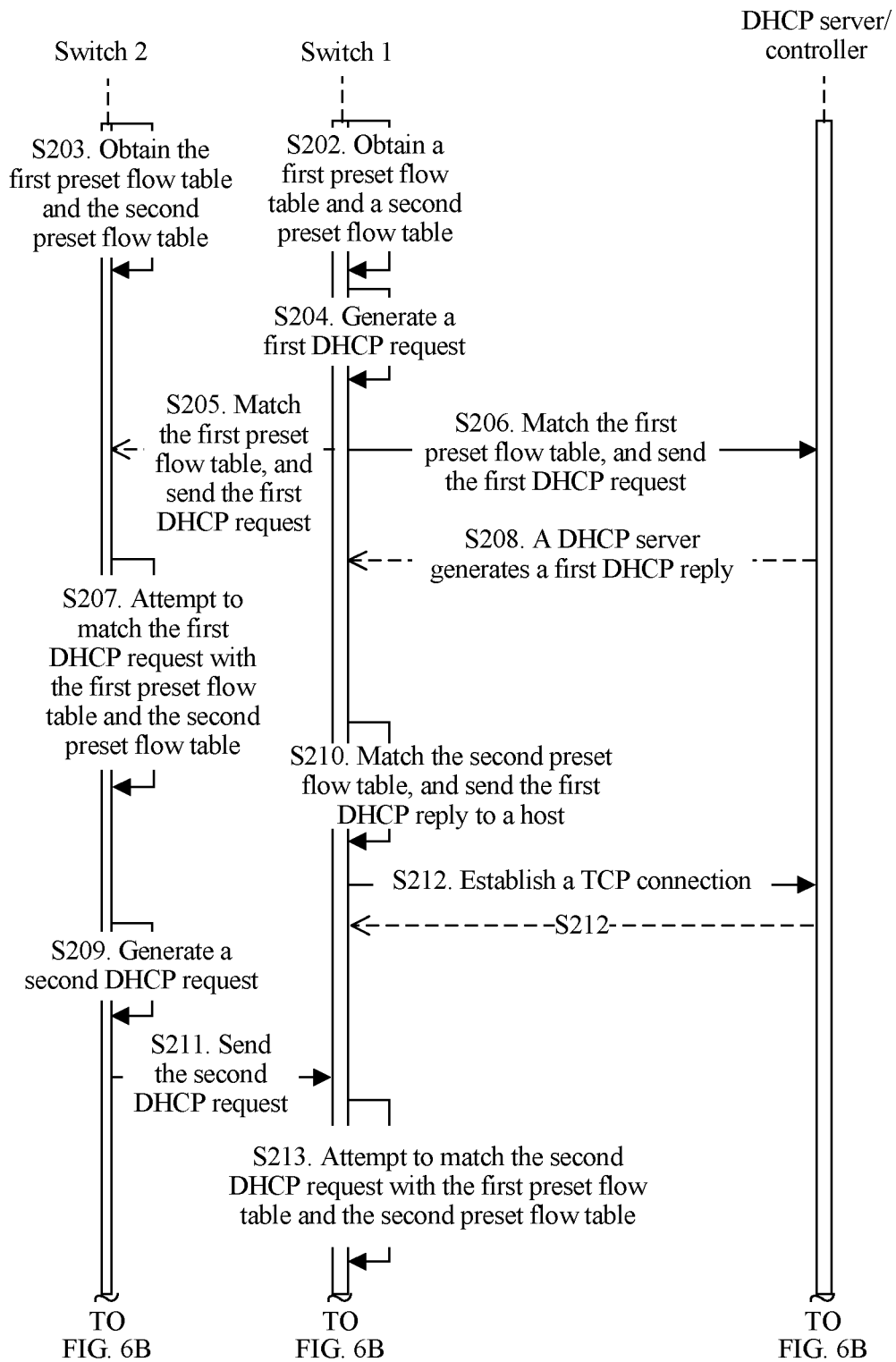
FIG. 6A and FIG. 6B are a diagram of a controlled procedure of a switch according to this application.
Figure 6B:
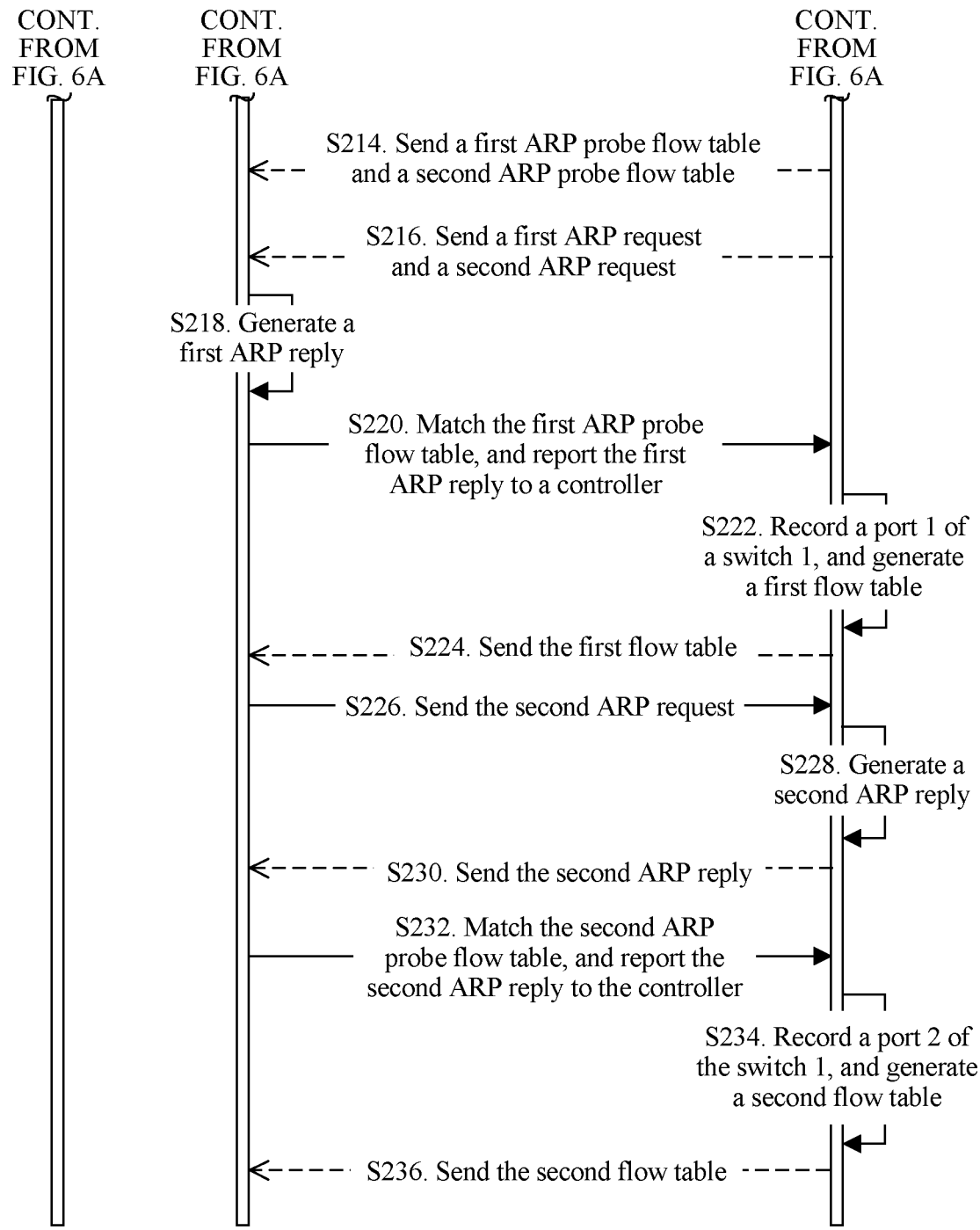

FIG. 6A and FIG. 6B show a controlled process of the switch 1 in FIG. 5 according to an embodiment of the present disclosure. It should be noted that an execution sequence of steps in FIG. 6A and FIG. 6B is not limited, and a plurality of steps may be performed in parallel.

S202. The switch 1 obtains a first preset flow table and a second preset flow table.

A match field of the first preset flow table of the switch 1 includes a source MAC address of a packet=a MAC address of the switch 1. An action field of the first preset flow table of the switch 1 includes performing sending through all available forwarding ports of the switch 1. A match field of the second preset flow table of the switch 1 includes a destination MAC address of a packet=the MAC address of the switch 1. An action field of the second preset flow table of the switch 1 includes performing sending through all the available forwarding ports of the switch 1. A forwarding plane of the switch 1 obtains and stores the first preset flow table and the second preset flow table.

S203. A switch 2 obtains a first preset flow table and a second preset flow table.

A match field of the first preset flow table of the switch 2 includes a source MAC address of a packet=a MAC address of the switch 2. A match field of the second preset flow table of the switch 2 includes a destination MAC address of a packet=the MAC address of the switch 2. An action field of the first preset flow table and an action field of the second preset flow table that are of the switch 2 include performing sending through all available forwarding ports of the switch 2.

S204. The switch 1 generates a first DHCP request.

In this case, the switch 1 knows only the MAC address of the switch 1. Therefore, a control plane of the switch 1 generates the first DHCP request to request a DHCP server to allocate an IP address of the switch 1, namely the IP address of the switch 1. A source MAC address in the first DHCP request is the MAC address of the switch 1.

S206. A forwarding plane of the switch 1 matches the first DHCP request with the first preset flow table, and sends the first DHCP request through all available forwarding ports of the switch 1 based on an action field of the first preset flow table.

Because the source MAC address of the first DHCP request is the MAC address of the switch 1, the first DHCP request can match the match field of the first preset flow table. Therefore, the forwarding plane sends the first DHCP request through all the available forwarding ports of the switch 1 based on an indication of the action field of the first preset flow table.

The DHCP server receives the first DHCP request sent by the switch 1. The switch 1 further sends the first DHCP request to another switch connected to the switch 1, for example, the switch 2 and a switch 3. However, in this case, the first DHCP request cannot match any flow table in the switch 2 or the switch 3. Therefore, the switch 2 and the switch 3 discard the first DHCP request such that a broadcast storm is not caused, and network load is reduced. For example, the switch 2 receives the first DHCP request sent by the switch 1, for example, in S205.

S207. The switch 2 obtains the first DHCP request using a port 4. A forwarding plane of the switch 2 attempts to match the first DHCP request with the first preset flow table of the switch 2 and the second preset flow table of the switch 2. After determining that the first DHCP request cannot match the match field of the first preset flow table of the switch 2 or the match field of the second preset flow table of the switch 2, the switch 2 discards the first DHCP request.

S205 and S207 are executed at any moment after S206, and may be executed in parallel with S208 and subsequent steps of S208.

S208. A DHCP server allocates IP 1 as an IP address of the switch 1 based on the first DHCP request, generates a first DHCP reply, and sends the first DHCP reply to a port 2 of the switch 1.

A destination MAC address of the first DHCP reply is the MAC address of the switch 1, and the first DHCP reply carries IP 1.

The DHCP server may notify a controller that the IP address of the switch 1 is IP 1 such that the controller records the IP address.

S210. The switch 1 obtains the first DHCP reply using the port 2. The forwarding plane of the switch 1 matches the first DHCP reply with the second preset flow table, and sends the first DHCP reply through all the available forwarding ports of the switch 1 based on the action field of the second preset flow table. Because a management port of the switch 1 is connected to a forwarding port 1, the control plane of the switch 1 can receive the first DHCP reply sent through the port 1, and obtain IP 1 from the first DHCP reply.

S212. The switch 1 establishes a TCP connection to a controller.

An IP address of the controller is preset in the switch 1. After obtaining IP 1, the control plane of the switch 1 establishes the TCP connection to the controller. In the establishment process, the controller learns of a correspondence between the switch 1 and IP 1. The establishment process includes a plurality of handshakes between the control plane of the switch 1 and the controller. Referring to S206, a packet to be sent to the controller is sent through all the available forwarding ports of the switch 1 by matching the first preset flow table. Referring to S210, a packet to be sent to the control plane of the switch 1 is sent through all the available forwarding ports of the switch 1 by matching the second preset flow table.

S214. The controller generates a first ARP probe flow table and a second ARP probe flow table, and sends the first ARP probe flow table and the second ARP probe flow table to the switch 1.

A match field of the first ARP probe flow table includes a packet type=ARP, and a source IP address of a packet=IP 1. An action field of the first ARP probe flow table includes performing reporting to the controller.

A match field of the second ARP probe flow table includes a packet type=ARP, and a source IP address of a packet=the IP address of the controller. An action field of the second ARP probe flow table includes performing reporting to the controller. In a reporting action, a number of an inport port, that is, a port that the packet enters, is also sent to the controller.

The controller may separately send the first ARP probe flow table and the second ARP probe flow table to the control plane of the switch 1. The control plane of the switch 1 sends the first ARP probe flow table and the second ARP probe flow table to the forwarding plane such that the forwarding plane stores the first ARP probe flow table and the second ARP probe flow table.

S216. The controller generates a first ARP request and a second ARP request, and sends the first ARP request and the second ARP request to the switch 1. In addition, the controller instructs the switch 1 to send the first ARP request and the second ARP request through all the available forwarding ports of the switch 1, for example, perform PacketOut of the first ARP request and the second ARP request.

The controller may send the first ARP request and the second ARP request to the switch 1 separately.

A source IP address of the first ARP request is an IP address of a gateway, and a destination IP address of the first ARP request is IP 1. The gateway is simulated by the controller. The IP address of the gateway is different from the IP address of the controller. A source IP address of the second ARP request is the IP address of the gateway, and a destination IP address of the second ARP request is the IP address of the controller.

After receiving the first ARP request and the second ARP request, the forwarding plane of the switch 1 sends the first ARP request and the second ARP request through all the available forwarding ports. Because the management port of the switch 1 is connected to the forwarding port 1, the control plane of the switch 1 can receive the first ARP request sent through the port 1. After receiving the first ARP request, the control plane of the switch 1 determines that the destination IP address in the first ARP request is the IP address of the switch 1. Therefore, the control plane of the switch 1 generates a first ARP reply based on the first ARP request. Refer to S218. The forwarding plane of the switch 1 sends the second ARP request to the controller through the port 2. Refer to S226. After receiving the second ARP request, the controller determines that the destination IP address in the second ARP request is the IP address of the controller. Therefore, the controller generates a second ARP reply based on the second ARP request. Refer to S228.

S218. The switch 1 receives the first ARP request, and generates a first ARP reply, where a source IP address of the first ARP reply is IP 1, and a destination IP address of the first ARP reply is an IP address of a gateway.

After obtaining, using the management port, the first ARP request sent through the port 1, the control plane of the switch 1 generates the first ARP reply. The first ARP reply is sent from the management port, and is sent to the forwarding plane of the switch 1 through the port 1. Therefore, an inport port number in the first ARP reply in S220 is port 1.

S220. The forwarding plane of the switch 1 matches the first ARP reply with the first ARP probe flow table, and reports the first ARP reply to the controller based on an action field of the first ARP probe flow table.

In addition to the first ARP reply, an inport port for the first ARP reply, namely the forwarding port 1 connected to the management port of the switch 1, is also reported to the controller. In this case, the switch 1 does not know a specific forwarding port used for connecting the controller and the switch 1. Therefore, the switch 1 may send the first ARP reply and the port 1 through all the available forwarding ports in order to report the first ARP reply to the controller.

S222. The controller receives the reported first ARP reply and port 1, and the controller records the port 1 of the switch 1 and generates a first flow table based on the port 1, where the first flow table instructs to send a packet whose destination is the switch 1 (that is, whose destination is the control plane of the switch 1) through the port 1.

A match field of the first flow table includes a destination is the switch 1. An action field of the first flow table includes performing sending through the port 1.

Further, the first flow table may include one or more flow tables. All action fields of the plurality of flow tables are performing sending through the port 1. A match field of each flow table may include any one or any combination of the following.

A destination MAC address of a packet is the MAC address of the switch 1, a destination IP address of a packet is IP 1, or another field that can be used to determine the switch 1.

In S222, the controller generates the first flow table for unicast based on a connection relationship between the management port of the switch 1 and the forwarding port 1.

The controller instructs the switch 1 to set a priority of the first flow table to be higher than that of the second preset flow table, or the controller instructs the switch 1 to delete the second preset flow table after receiving the first flow table. Therefore, when the switch 1 subsequently receives a packet whose destination is the switch 1, the switch 1 does not need to send the packet through all the available forwarding ports based on the second preset flow table, and can accurately send the packet to the management port of the switch 1 through the port 1 based on the first flow table, thereby alleviating network pressure.

S224. The controller sends the first flow table to the switch 1.

Subsequently, the control plane of the switch 1 receives the first flow table, and stores the first flow table in the forwarding plane of the switch 1. The priority of the first flow table is higher than that of the second preset flow table. Alternatively, according to the instruction of the controller, the second preset flow table is deleted after the first flow table is stored.

Before S224, if a switch adjacent to the switch 1 generates a DHCP request, refer to S209 to S213 for this scenario. S209 to S213 may be performed at any moment before the switch 1 obtains the first flow table. That the switch 2 generates a second DHCP request is used as an example.

S209. The switch 2 generates a second DHCP request, where a source MAC address of the second DHCP request is a MAC address of the switch 2.

S211. Because the second DHCP request can match the first preset flow table of the switch 2, the switch 2 sends the second DHCP request through all available forwarding ports based on an action field of the first preset flow table of the switch 2.

S213. The switch 1 receives the second DHCP request from a forwarding port 3, and attempts to match the second DHCP request with the first preset flow table of the switch 1 and the second preset flow table of the switch 1. After determining that the second DHCP request cannot match the match field of the first preset flow table of the switch 1 or the match field of the second preset flow table of the switch 1, the switch 1 discards the second DHCP request, thereby restricting a broadcast range of the second DHCP request, and reducing network load.

S226. The switch 1 sends the second ARP request to the controller.

In S216, the controller instructs the switch 1 to send the second ARP request through all the available forwarding ports of the switch 1, and the forwarding plane of the switch 1 sends the second ARP request to the controller using the port 2.

S228. After receiving the second ARP request, the controller generates a second ARP reply, where a source IP address of the second ARP reply is the IP address of the controller, and a destination IP address of the second ARP reply is the IP address of the gateway.

S230. The controller sends the second ARP reply to the switch 1.

S232. The forwarding plane of the switch 1 matches the second ARP reply with the second ARP probe flow table, and reports the second ARP reply to the controller based on an action field of the second ARP probe flow table.

The second ARP reply enters the forwarding plane of the switch 1 through the port 2. In addition to the second ARP reply, an inport port for the second ARP reply, that is, the forwarding port 2 used for connecting the switch 1 and the controller, is also reported to the controller. In this case, the switch 1 does not know a specific forwarding port used for connecting the controller and the switch 1. Therefore, the switch 1 may send the second ARP reply through all the available forwarding ports in order to report the second ARP reply to the controller.

S234. The controller records the port 2 of the switch 1 and generates a second flow table, where the second flow table instructs to send a packet whose destination is the controller or the DHCP server through the port 2.

A match field of the second flow table includes a destination is the controller or the DHCP server. An action field of the second flow table includes sending through the port 2.

Further, the second flow table may include one or more flow tables. All action fields of the plurality of flow tables are performing sending through the port 2. A match field of each flow table may include any one or any combination of the following.

A packet type=DHCP, a packet type=User Datagram Protocol (UDP), and a destination port=67, a destination MAC address is a MAC address of the controller, a destination IP address is the IP address of the controller, another field that can be used to determine the DHCP server, and another field that can be used to determine the controller.

In S234, the controller learns of a connection relationship between the forwarding port 2 of the switch 1 and the controller, and may generate the second flow table for unicast. The controller may instruct the switch 1 to set a priority of the second flow table to be higher than that of the first preset flow table, or the controller instructs the switch 1 to delete the first preset flow table after receiving the second flow table. Therefore, when the switch 1 subsequently receives a packet whose destination is the DHCP server or the controller, the switch 1 can accurately send the packet to the DHCP server or the controller through the port 2 based on the second flow table. After obtaining the second flow table, if the switch 1 receives a DHCP request generated by an adjacent switch, the switch 1 may send, based on the second flow table, the DHCP request generated by the adjacent switch to the DHCP server. Therefore, layer-by-layer control on switches in the network is ensured. To be specific, the switch 1 is first controlled (a forwarding port of the switch 1 is identified by the controller), and then a switch adjacent to the switch 1 is controlled.

S236. The controller sends the second flow table to the switch 1.

Then, the switch 1 receives and stores the second flow table. The priority of the second flow table is higher than that of the first preset flow table. Alternatively, the controller instructs the switch 1 to delete the first preset flow table after storing the second flow table.

There is no fixed execution sequence between S226 to S236 and S218 to S224. Alternatively, the switch 1 may perform S226 and S218 in parallel.

According to the procedure corresponding to FIG. 6A and FIG. 6B, in a process of obtaining the IP 1, the switch 1 does not broadcast a DHCP packet sent by another switch. After the switch 1 is controlled, the controller then controls a next-hop switch layer by layer, thereby reducing a quantity of broadcast packets in the network, and improving boot efficiency. In addition, the packet sent to the control plane of the switch 1 and the packets sent to the DHCP server and the controller are all changed from initial broadcast flow tables (the first preset flow table and the second preset flow table) to unicast flow tables (the first flow table and the second flow table), thereby significantly improving efficiency of subsequently sending a packet by the switch 1. In addition, according to this procedure, the IP address and the MAC address of the switch 1, and a connection relationship between forwarding ports are all learned by the controller, and the control plane of the switch 1 establishes a connection to the controller, and is controlled by the controller. In this procedure, the switch 1 does not need a port learning function, and the control plane and the forwarding plane of the switch 1 are combined into one network, thereby reducing a requirement on the switch 1, that is, reducing network architecture costs.

Figure 8A:
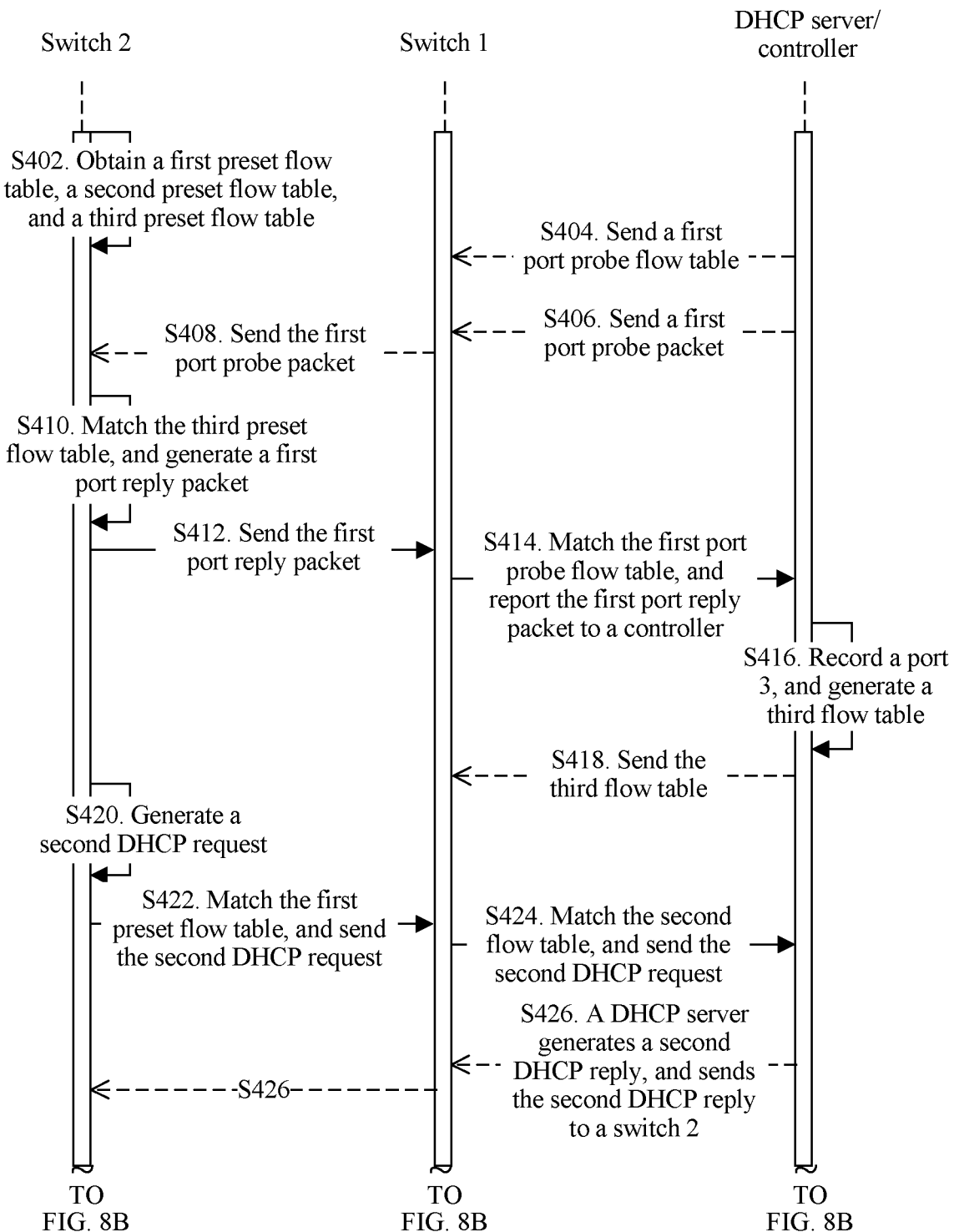
FIG. 8A and FIG. 8B are a diagram of a controlled procedure of a switch according to this application.
Figure 8B:
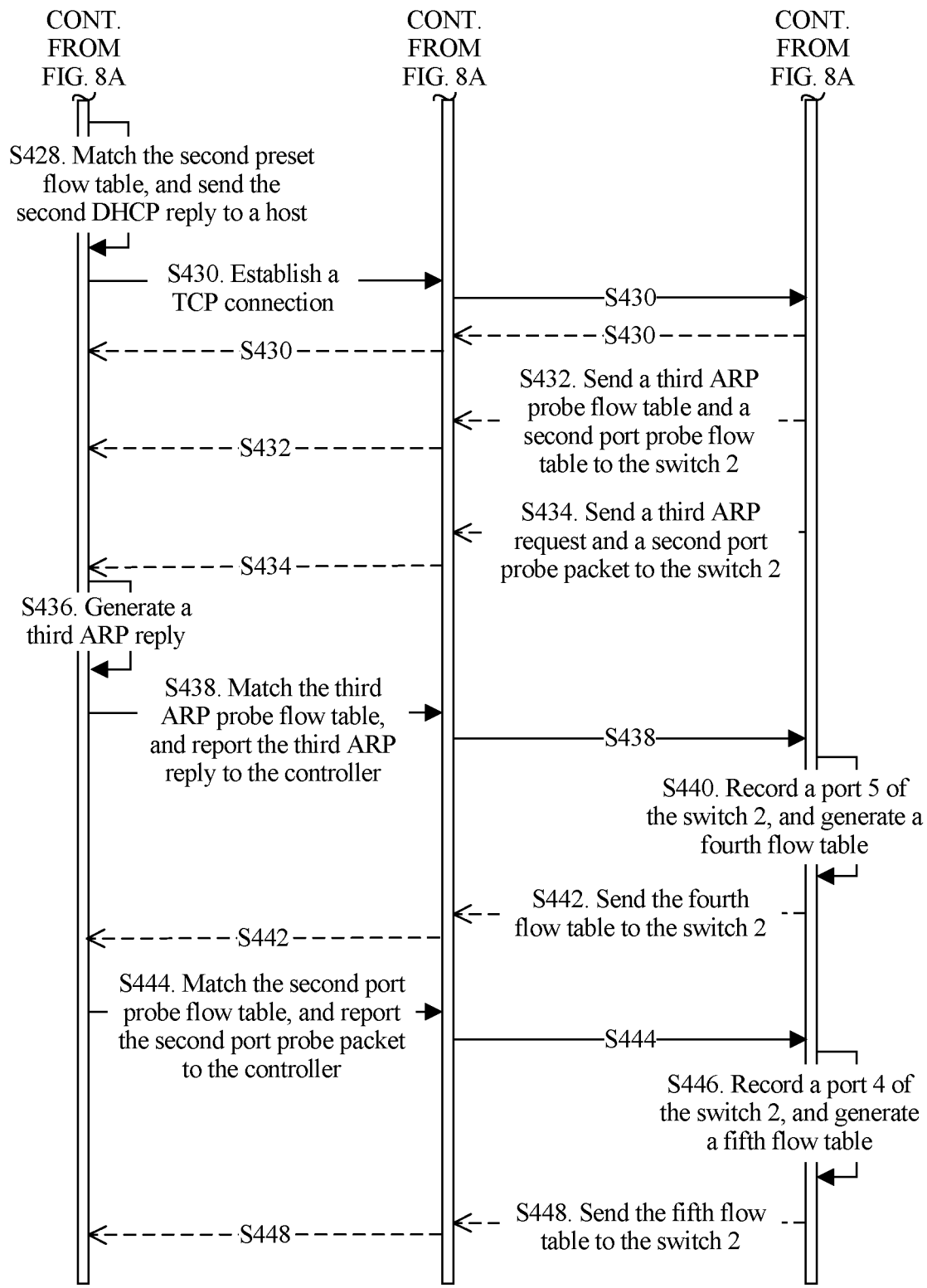

After the switch 1 is controlled by the controller, a next-hop switch (the switch 2 and the switch 3) of the switch 1 starts a controlled procedure. FIG. 8A and FIG. 8B show an embodiment in which a controlled procedure of a switch 2 is described using the switch 2 as an example according to this application. FIG. 7 shows an embodiment according to this application. In this embodiment, a connection relationship between forwarding ports of a switch 2 and a switch 1 is described. An execution sequence of steps in FIG. 8A and FIG. 8B is not limited, and a plurality of steps may be performed in parallel.

S402. The switch 2 obtains a first preset flow table, a second preset flow table, and a third preset flow table.

A forwarding plane of the switch 2 obtains and stores the first preset flow table, the second preset flow table, and the third preset flow table. For details, refer to step S201 in FIG. 6A and FIG. 6B, and details are not described herein again.

A match field of the third preset flow table includes a packet type=LLDP, and a source MAC address of a packet is all 0s. An action field of the third preset flow table includes changing a source MAC address of a packet to a MAC address of a local switch (a MAC address of the switch 2), and sending the changed packet through an inport port.

The source MAC address of the packet in the match field of the third preset flow table may be flexibly set in addition to being all 0s. For example, the source MAC address of the packet in the match field of the third preset flow table is the same as that of a first port probe packet in S406.

S404. A controller generates a first port probe flow table, and sends the first port probe flow table to a switch 1.

A match field of the first port probe flow table includes a packet type=LLDP. An action field of the first port probe flow table includes performing reporting to the controller.

S406. The controller generates a first port probe packet, and sends the first port probe packet to the switch 1, and the controller instructs the switch 1 to send the first port probe packet through all available forwarding ports of the switch 1, for example, perform PacketOut of the first port probe packet.

A packet type of the first port probe packet may be LLDP. A source MAC address of the first port probe packet may be all 0s.

S408. The switch 1 sends the first port probe packet to a port 4 of the switch 2 using a port 3.

S410. A forwarding plane of the switch 2 matches the first port probe packet with the third preset flow table, and changes a source MAC address of the first port probe packet to a MAC address of the switch 2 based on an action field of the third preset flow table in order to generate a first port reply packet.

S412. The switch 2 sends the first port reply packet to the port 3 of the switch 1 through the port 4 based on the action field of the third preset flow table.

S414. A forwarding plane of the switch 1 receives the first port reply packet using the port 3, and the forwarding plane of the switch 1 matches the first port reply packet with the first port probe flow table, and reports the first port reply packet to the controller based on a match field of the first port probe flow table. In a reporting action, an inport port for the first port reply packet, namely the port 3, is also sent to the controller.

S416. The controller records a correspondence between the port 3 and the MAC address of the switch 2, and generates a third flow table.

The controller determines, based on the MAC address of the switch 2 that is carried in the first port reply packet and the port 3, that the switch 1 is connected to the switch 2 using the port 3, and generates the third flow table.

A match field of the third flow table includes a destination is the switch 2. An action field of the third flow table includes performing sending through the port 3.

Further, the match field of the third flow table may include a destination MAC address of a packet is the MAC address of the switch 2.

S418. The controller sends the third flow table to the switch 1.

The forwarding plane of the switch 1 receives and stores the third flow table. Using the third flow table, when subsequently receiving a packet whose destination is the switch 2, the switch 1 can accurately send the packet to the switch 2 through the port 3 in order to reduce broadcast and network load.

S404 to S418 may also be performed after or during S420 to S448.

S420. A control plane of the switch 2 generates a second DHCP request, and sends the second DHCP request to the forwarding plane of the switch 2 using a management port of the switch 2, where a source MAC address of the second DHCP request is the MAC address of the switch 2.

S422. The forwarding plane of the switch 2 matches the second DHCP request with the first preset flow table, and sends the second DHCP request through all available forwarding ports of the switch 2 based on an action field of the first preset flow table.

S424. The switch 1 receives the second DHCP request from the port 3, and sends the second DHCP request to a DHCP server.

Further, the switch 1 matches the second DHCP request with a second flow table, and sends the second DHCP request to the DHCP server using a port 2.

Because a packet type of the second DHCP request is DHCP, the second DHCP request can match the second flow table.

S426. The DHCP server allocates IP 2 as an IP address of the switch 2 based on the second DHCP request, and the DHCP server generates a second DHCP reply, and sends the second DHCP reply to the switch 2 using the switch 1, where a destination MAC address of the second DHCP reply is the MAC address of the switch 2, and the second DHCP reply carries IP 2.

S428. The switch 2 obtains the second DHCP reply, and the forwarding plane of the switch 2 matches the second DHCP reply with the second preset flow table, and sends the second DHCP reply through all the available forwarding ports of the switch 2 based on an action field of the second preset flow table. Because the management port of the switch 2 is connected to a forwarding port 5, the control plane of the switch 2 can receive the second DHCP reply and obtain IP 2.

S430. The switch 2 establishes a TCP connection to the controller.

For a process of establishing the TCP connection, refer to S212 in FIG. 6A and FIG. 6B.

S432. The controller generates a third ARP probe flow table and a second port probe flow table, and sends the third ARP probe flow table and the second port probe flow table to the switch 2 using the switch 1.

A match field of the third ARP probe flow table includes a packet type=ARP, and a source IP address of a packet=IP 2. An action field of the third ARP probe flow table includes performing reporting to the controller.

A match field of the second port probe flow table includes a packet type=LLDP. An action field of the second port probe flow table includes performing reporting to the controller.

The controller may send the third ARP probe flow table and the second port probe flow table to the switch 2 at two separate times.

S434. The controller generates a third ARP request and a second port probe packet, and sends the third ARP request and the second port probe packet to the switch 2 using the switch 1, and the controller instructs the switch 2 to send the third ARP request through all the available forwarding ports of the switch 2, for example, perform PacketOut of the third ARP request.

A packet type of the second port probe packet may be LLDP. A source MAC address of the second port probe packet may be a MAC address of the switch 1. A destination IP address of the third ARP request is IP 2.

The controller may send the third ARP request and the second port probe packet to the switch 2 at two separate times.

S436. The control plane of the switch 2 receives, using the management port, the third ARP request sent through the port 5, and generates a third ARP reply, where a source IP address of the third ARP reply is IP 2.

S438. The forwarding plane of the switch 2 obtains the third ARP reply using the port 5, matches the third ARP probe flow table with the third ARP reply, and reports the third ARP reply to the controller based on an action field of the third ARP probe flow table. An inport port for the third ARP reply, namely the forwarding port 5 connected to the management port of the switch 2, is reported to the controller.

S440. The controller records the port 5 of the switch 2, and generates a fourth flow table based on the port 5, where the fourth flow table instructs to send a packet whose destination is the switch 2 through the port 5.

Further, the fourth flow table may include one or more flow tables. All action fields of the plurality of flow tables are performing sending through the port 5. A match field of each flow table may include any one or any combination of the following.

A destination MAC address of a packet is the MAC address of the switch 2, a destination IP address of a packet is IP 2, and another field that can be used to determine the switch 2.

S442. The controller sends the fourth flow table to the switch 2 using the switch 1, and the forwarding plane of the switch 2 stores the fourth flow table.

A priority of the fourth flow table is higher than that of the second preset flow table of the switch 2. Alternatively, the controller instructs the switch 2 to delete the second preset flow table of the switch 2 after storing the fourth flow table.

S444. The forwarding plane of the switch 2 matches the second port probe packet with the second port probe flow table, and reports the second port probe packet to the controller based on an action field of the second port probe flow table. Because the second port probe packet enters the forwarding plane of the switch 2 from the port 4, an inport port for the second port probe packet, namely the port 4, is reported to the controller.

S446. The controller records the forwarding port 4 used for connecting the switch 2 and the switch 1, and generates a fifth flow table based on the port 4, where the fifth flow table instructs to send a packet whose destination is the DHCP server, the controller, or the switch 1 through the port 4.

When S446 is performed, the controller has obtained identification information of the switch 1 such as the MAC address and IP address information of the switch 1. Therefore, the identification information of the switch 1 may be carried in the second port probe packet. The controller may learn that the port 4 carried in the second port probe packet reported in S444 is connected to the switch 1, and therefore the controller can generate the fifth flow table.

S448. The controller sends the fifth flow table to the switch 2 using the switch 1, and the forwarding plane of the switch 2 stores the fifth flow table.

Further, the fifth flow table may include one or more flow tables. All action fields of the plurality of flow tables are performing sending through the port 4. A match field of each flow table may include any one or any combination of the following.

A packet type=DHCP, a packet type=UDP, and a destination port=67, a destination MAC address is the MAC address of the controller, a destination IP address is the IP address of the controller, another field that can be used to determine the DHCP server, another field that can be used to determine the controller, a destination is the IP address of switch 1, a destination is the MAC address of the switch 1, and another field that can be used to determine the switch 1.

S436 to S442 and S444 to S448 are respectively used to locate the forwarding port connected to the control plane of the switch 2 and the forwarding port used for connecting the switch 2 and the switch 1. There is no fixed execution sequence between S436 to S442 and S444 to S448, and S436 to S442 and S444 to S448 may alternatively be performed in parallel.

In procedures corresponding to FIG. 6A and FIG. 6B, FIG. 8A and FIG. 8B, and subsequent FIG. 10A and FIG. 10B, and FIG. 12A and FIG. 12B, an ARP probe flow table and an ARP type packet are used to locate an inport port (for example, the port 1 and the port 5) connected to a control plane of a switch and an inport port (for example, the port 2) used for connecting a switch and the controller and the DHCP server. In addition, a port probe flow table, a port probe packet, and a port reply packet are used to locate a forwarding port (for example, the port 3 and the port 4) connected between switches. In addition to using a port probe packet and a port reply packet that are of an LLDP type to locate a forwarding port connected between switches, another network protocol supported by the switch, for example, virtual local area network (VLAN) and Multiprotocol Label Switching (MPLS), may be used. When another network protocol such as MPLS is used, in a match field of a port probe flow table, a packet type=MPLS, a packet type of a port probe packet sent by the controller is MPLS, and a packet type of a port reply packet generated by the switch is MPLS.

According to the procedure corresponding to FIG. 8A and FIG. 8B, the processing performed by the switch 2 on the packet sent to the control plane of the switch 2 and the packets sent to the DHCP server and the controller is changed from initial processing based on broadcast flow tables (the first preset flow table and the second preset flow table) to processing based on unicast flow tables (the third flow table and the fourth flow table), thereby significantly improving efficiency of subsequently sending such packets by the switch 2. In addition, according to this procedure, the IP address and the MAC address of the switch 2, and a connection relationship between forwarding ports are all learned by the controller, and the control plane of the switch 2 establishes a connection to the controller, and is controlled by the controller. In this procedure, the switch 2 does not need a port learning function, and the control plane and the forwarding plane of the switch 2 are combined into one network, thereby reducing a requirement on the switch 2, that is, reducing network architecture costs.

For a controlled process of another switch in the network, refer to the processes shown in FIG. 6A and FIG. 6B, and FIG. 8A and FIG. 8B. In the network, layer-by-layer control starts from a switch connected to the controller. After the switch directly connected to the controller is controlled using the procedure shown in FIG. 6A and FIG. 6B, a next-hop switch of the controlled switch is controlled using the procedure shown in FIG. 8A and FIG. 8B, and then the control spreads to a next-hop switch layer by layer until all switches in the network are controlled by the controller. After all the switches are controlled, the controller knows a port connection status of each switch. Therefore, the controller may deliver a flow table for accurately controlling a packet flow direction to the controlled switches in order to reduce packet broadcast in the network and reduce network pressure.

The procedures corresponding to FIG. 6A and FIG. 6B and FIG. 8A and FIG. 8B describe a process in which each switch in the network is controlled in a scenario in FIG. 1. Controlled processes of a switch in the scenarios of FIG. 2A and FIG. 2B are similar to that in the scenario of FIG. 1, and are separately described in the following.

Figure 9:
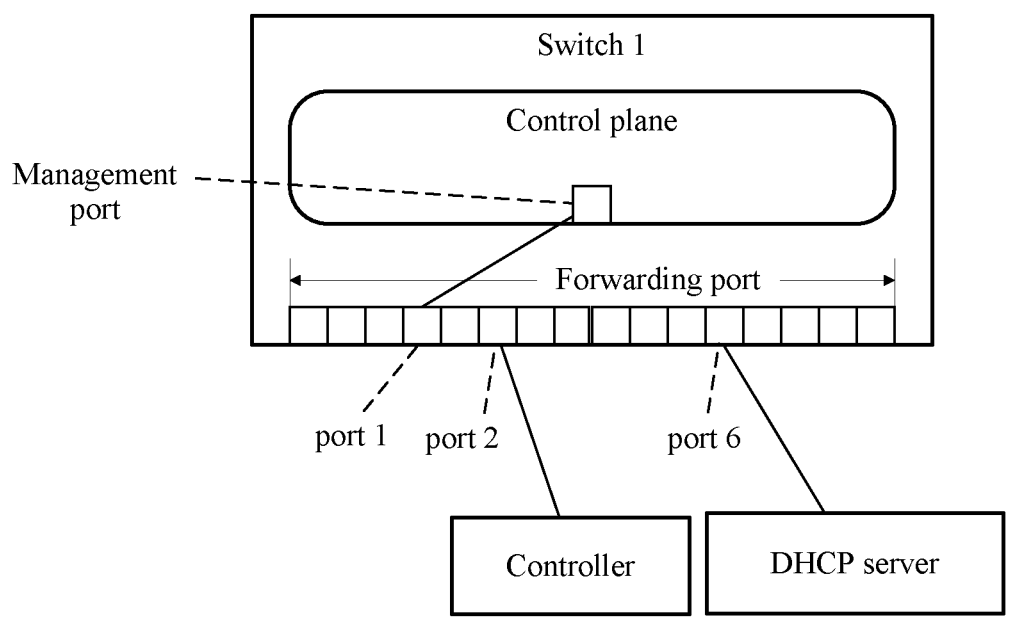
FIG. 9 is a schematic diagram of a connection relationship between a switch, a controller, and a DHCP server according to this application.

In the scenario of FIG. 2A, the DHCP server and the controller are respectively located in different servers, that is, connected to the switch 1 using different ports. Therefore, in addition to the procedures in FIG. 6A and FIG. 6B and FIG. 8A and FIG. 8B, a port for connecting the DHCP server and the switch 1 needs to be located. As shown in FIG. 9, the DHCP server is connected to a port 6 of the switch 1. An execution sequence of steps in FIG. 10A and FIG. 10B is not limited, and a plurality of steps may be performed in parallel.

Figure 10A:
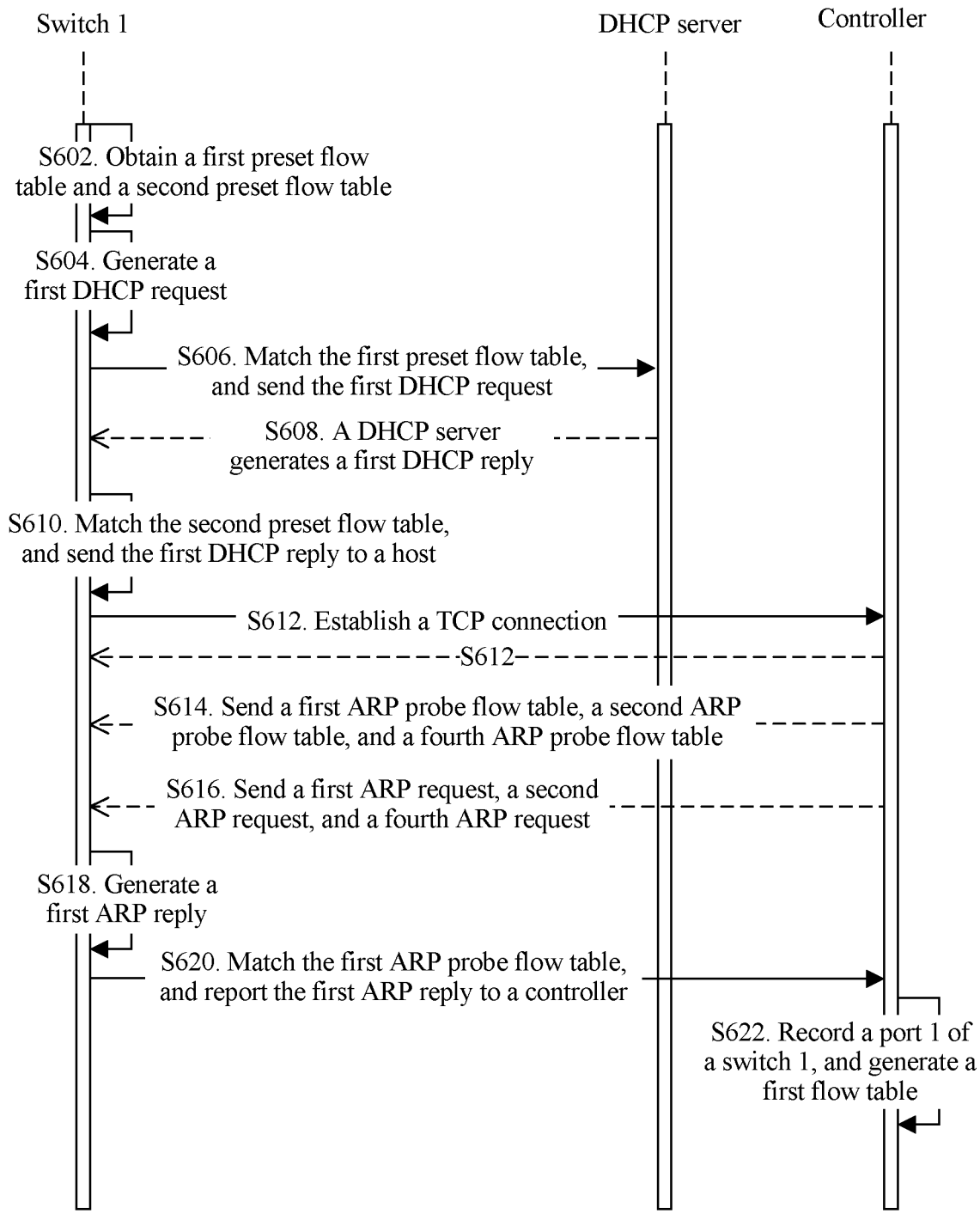
FIG. 10A and FIG. 10B are a diagram of a controlled procedure of a switch according to this application.
Figure 10B:
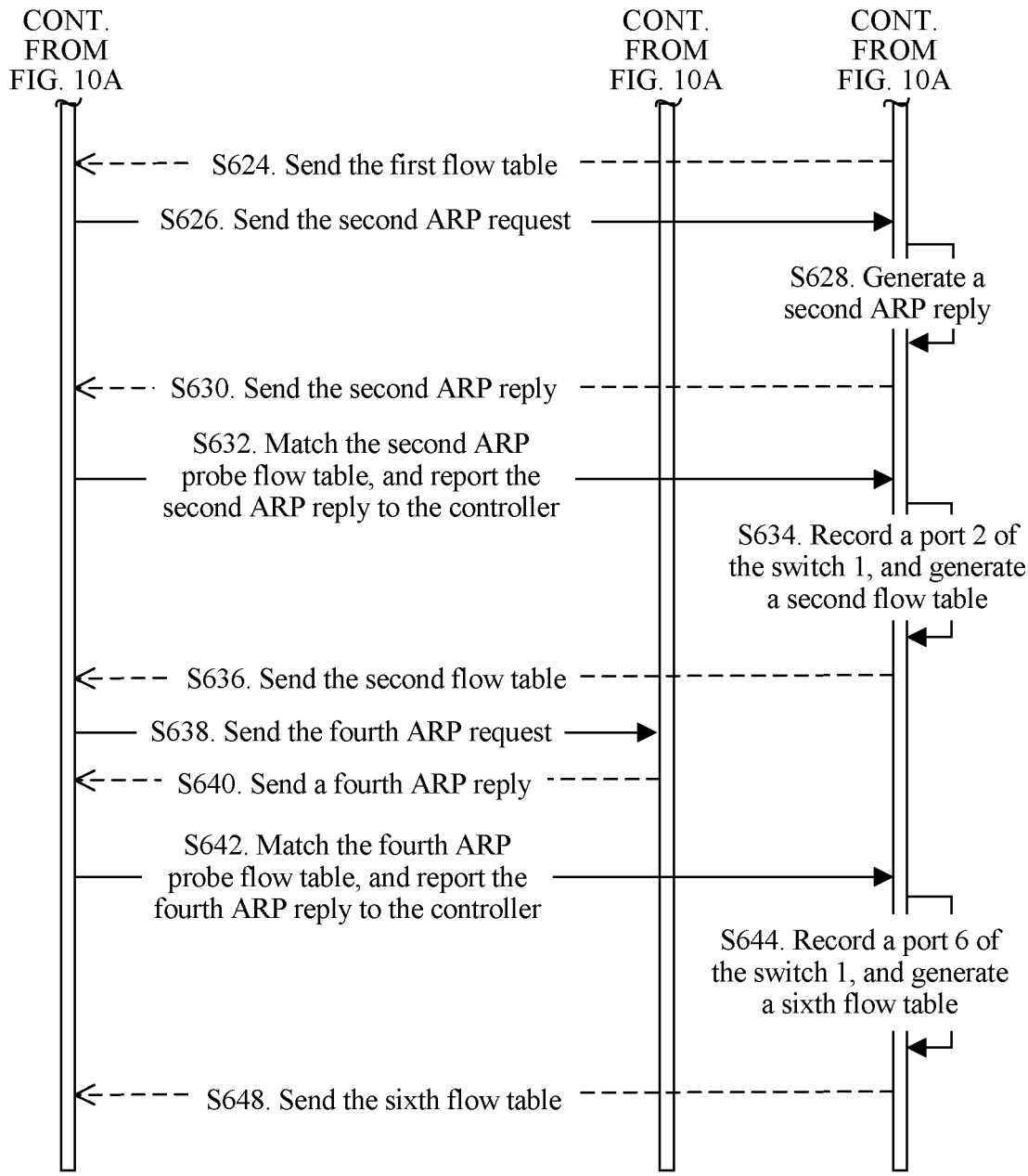

In FIG. 10A and FIG. 10B, except S606 and S608 in which the switch 1 and the DHCP server communicate with each other, S602 to S636 are corresponding to steps S202 to S236. The following mainly describes different steps and new steps in FIG. 10A and FIG. 10B compared with FIG. 6A and FIG. 6B.

In S614, the controller further needs to generate a fourth ARP probe flow table, and send the fourth ARP probe flow table to the switch 1.

A match field of the fourth ARP probe flow table includes a packet type=ARP, and a source IP address of a packet=an IP address of the DHCP server. An action field of the ARP probe flow table includes performing reporting to the controller.

In S616, the controller further generates a fourth ARP request, and sends the fourth ARP request to the switch 1. In addition, the controller instructs the switch 1 to send the fourth ARP request through all available forwarding ports of the switch 1. A source IP address of the fourth ARP request is an IP address of a gateway, and a destination IP address of the fourth ARP request is the IP address of the DHCP server.

After the controller sends the fourth ARP request to the switch 1 in S616, the switch 1 sends the fourth ARP request to the DHCP server in S638.

S640. The DHCP server sends a fourth ARP reply to the switch 1.

Because the destination IP address in the fourth ARP request is the IP address of the DHCP server, the DHCP server generates the fourth ARP reply based on the fourth ARP request. A source IP address of the fourth ARP reply is the IP address of the DHCP server.

S642. The forwarding plane of the switch 1 matches the fourth ARP probe flow table with the fourth ARP reply, and reports the fourth ARP reply to the controller based on an action field of the fourth ARP probe flow table together with an inport port through which the fourth ARP reply enters the switch 1, namely the port 6.

S644. The controller records that the port 6 of the switch 1 is connected to the DHCP server, and generates a sixth flow table, where the sixth flow table instructs to send a packet whose destination is the DHCP server through the port 6.

A match field of the sixth flow table includes a destination is the DHCP server. An action field of the sixth flow table includes performing sending through the port 6.

Further, the match field of the sixth flow table may be any one or any combination of the following A packet type=DHCP, a packet type=UDP, and a destination port=67, and another field that can be used to determine the DHCP server.

S648. The controller sends the sixth flow table to the switch 1. After receiving the sixth flow table, the forwarding plane of the switch 1 can accurately process a packet whose destination is the DHCP server and that is subsequently received, thereby improving packet processing efficiency.

There is no fixed execution sequence among S626 to S636, S618 to S624, and S638 to S648. Alternatively, the switch 1 may perform S626, S618, and S638 in parallel.

After the switch 1 is controlled, for a controlled process of another switch in the network, refer to FIG. 8A and FIG. 8B.

Figure 11:
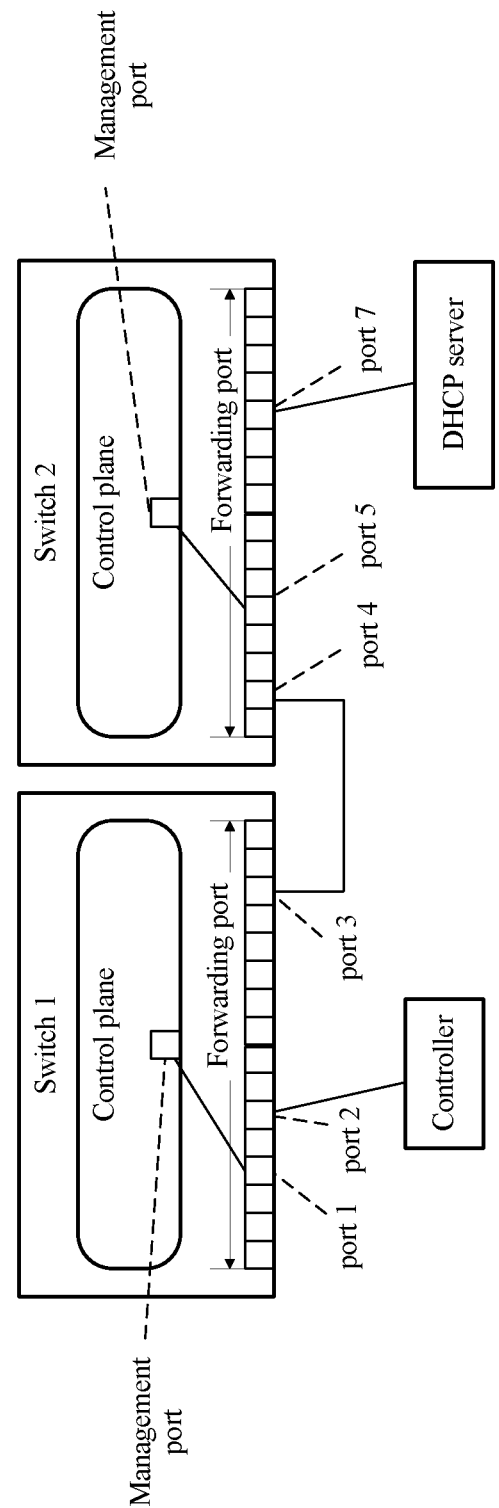
FIG. 11 is a schematic diagram of a connection relationship between a switch, a controller, and a DHCP server according to this application.
Figure 12A:
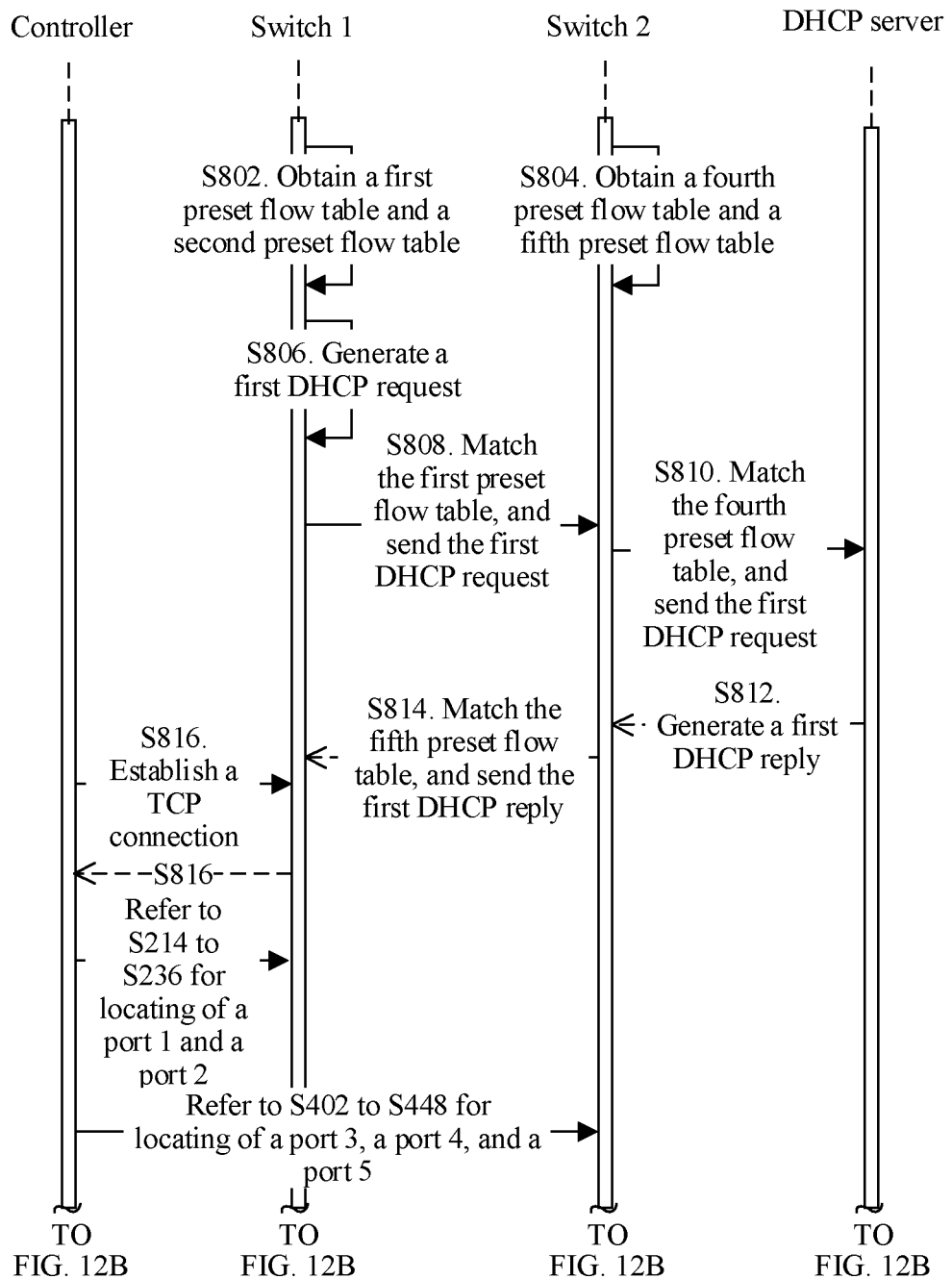
FIG. 12A and FIG. 12B are a diagram of a controlled procedure of a switch according to this application.
Figure 12B:
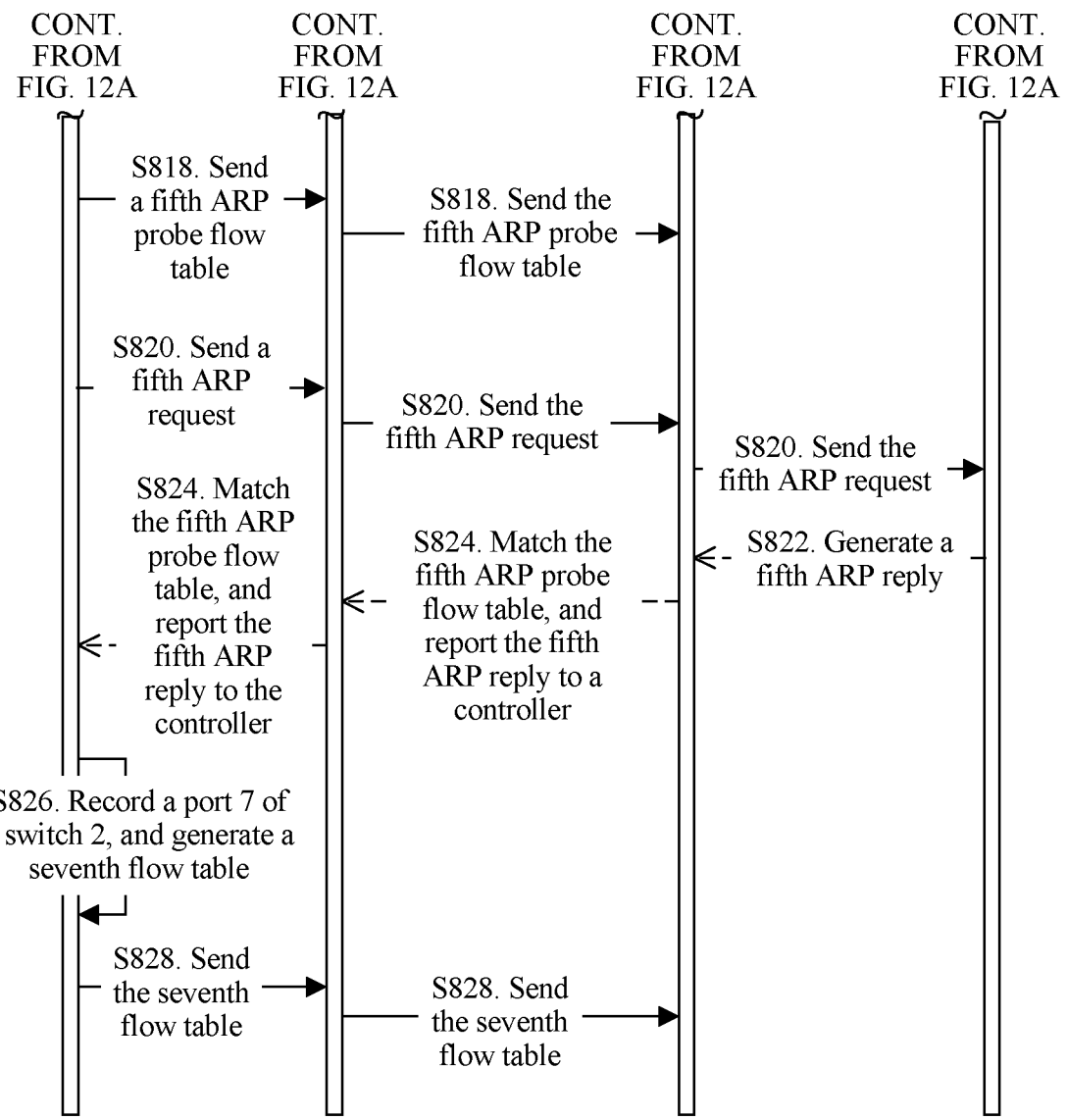

In the scenario of FIG. 2B, the DHCP server and the controller are located in different servers, and are connected to different switches. Therefore, in addition to the procedures in FIG. 6A and FIG. 6B and FIG. 8A and FIG. 8B, a port for connecting the DHCP server and the switch 2 needs to be located. As shown in FIG. 11, the DHCP server is connected to a port 7 of the switch 2. An execution sequence of steps in FIG. 12A and FIG. 12B is not limited, and a plurality of steps may be performed in parallel.

S802. A forwarding plane of a switch 1 obtains a first preset flow table of the switch 1 and a second preset flow table of the switch 1.

S804. A forwarding plane of a switch 2 obtains a fourth preset flow table and a fifth preset flow table.

A match field of the fourth preset flow table includes a source MAC address of a packet=a MAC address of the switch 1. A match field of the fifth preset flow table includes a destination MAC address of a packet=the MAC address of the switch 1. Both an action field of the fourth preset flow table and an action field of the fifth preset flow table include performing sending through all available forwarding ports of the switch 2.

S806. A control plane of the switch 1 generates a first DHCP request, and sends the first DHCP request to the forwarding plane using a management port, where a source MAC address of the first DHCP request is the MAC address of the switch 1.

S808. The forwarding plane of the switch 1 matches the first DHCP request with the first preset flow table, and sends the first DHCP request through all available forwarding ports of the switch 1 based on an action field of the first preset flow table.

S810. The switch 2 receives the first DHCP request using a port 4, and the forwarding plane of the switch 2 matches the first DHCP request with the fourth preset flow table, and sends the first DHCP request through all available forwarding ports of the switch 2 based on an action field of the fourth preset flow table, including sending the first DHCP request to a DHCP server through a port 7.

S812. The DHCP server receives the first DHCP request sent through the port 7, and allocates IP 1 as an IP address of the switch 1 based on the first DHCP request, and the DHCP generates a first DHCP reply, and sends the first DHCP reply to the port 7 of the switch 2.

A destination MAC address of the first DHCP reply is the MAC address of the switch 1, and the first DHCP reply carries IP 1.

S814. The switch 2 obtains the first DHCP reply using the port 7. The forwarding plane of the switch 2 matches the first DHCP reply with the fifth preset flow table, and sends the first DHCP reply through all the available forwarding ports of the switch 2 based on the action field of the fifth preset flow table, including sending the first DHCP reply to the switch 1 through the port 4 of the switch 2. The switch 1 receives, using a port 3, the first DHCP reply sent through the port 4 of the switch 2, and sends the first DHCP reply to the control plane of the switch 1 based on the second preset flow table of the switch 1 such that the control plane of the switch 1 obtains IP 1.

S816. The switch 1 establishes a TCP connection to the controller. Further, refer to S212 for S816.

After S816, for locating of the port 1 and the port 2 of the switch 1 and generation of unicast flow tables (the first flow table and the second flow table in the procedure corresponding to FIG. 6A and FIG. 6B), refer to S214 to S236. For locating of the port 3 of the switch 1, and the port 4 and the port 5 of the switch 2 and generation of unicast flow tables (the third flow table, the fourth flow table, and the fifth flow table in the procedure corresponding to FIG. 8A and FIG. 8B), refer to S402 to S448.

S818. The controller generates a fifth ARP probe flow table, and sends the fifth ARP probe flow table to the switch 2.

A match field of the fifth ARP probe flow table includes a packet type=ARP, and a source IP address of a packet=an IP address of the DHCP server. An action field of the ARP probe flow table includes performing reporting to the controller.

S820. The controller further generates a fifth ARP request, and sends the fifth ARP request to the switch 2 using the switch 1, and the controller instructs the switch 2 to send the fifth ARP request through all the available forwarding ports of the switch 2, where a source IP address of the fifth ARP request is an IP address of a gateway, and a destination IP address of the fifth ARP request is an IP address of the DHCP server.

S822. The DHCP server generates a fifth ARP reply based on the fifth ARP request, where a source IP address of the fifth ARP reply is the IP address of the DHCP server, and the DHCP server sends the fifth ARP reply to the switch 2.

S824. The forwarding plane of the switch 2 matches fifth ARP probe flow table with the fifth ARP reply, and reports the fifth ARP reply to the controller together with an inport port through which the fifth ARP reply enters the switch 2, namely the port 7.

S826. The controller records that the port 7 of the switch 2 is connected to the DHCP server, and generates a seventh flow table, where the seventh flow table instructs to send a packet whose destination is the DHCP server through the port 7.

A match of the seventh flow table includes a destination is the DHCP server. An action field of the seventh flow table includes performing sending through the port 7.

Further, the match field of the seventh flow table may be any one or any combination of the following a packet type=DHCP, a packet type=UDP, and a destination port=67, and another field that can be used to determine the DHCP server.

S828. The controller sends the seventh flow table to the switch 2. After receiving the seventh flow table, the forwarding plane of the switch 2 can accurately process a packet whose destination is the DHCP server and that is subsequently received, thereby improving packet processing efficiency.

S818 to S828 may be performed in any sequence or may be performed in parallel with the locating of the port 1, the port 2, and the port 3 of the switch 1 and the locating of the port 4 and the port 5 of the switch 2.

Using the procedures provided in FIG. 6A and FIG. 6B, FIG. 8A and FIG. 8B, FIG. 10A and FIG. 10B, and FIG. 12A and FIG. 12B, regardless of a manner in which the controller and the DHCP server are deployed in the network, a switch in the network can be automatically controlled without intervention by management personnel, thereby reducing difficulty of network operation, maintenance, and management.

Figure 13:
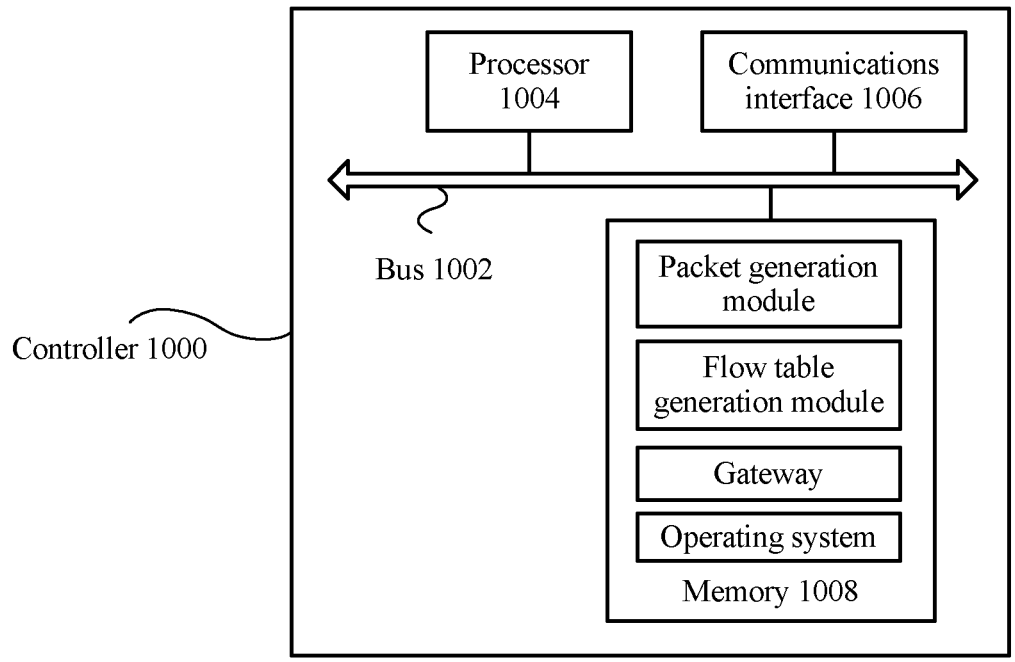
FIG. 13 is a schematic structural diagram of a controller according to this application.

FIG. 13 provides a controller 1000. The controller 1000 includes a bus 1002, a processor 1004, a communications interface 1006, and a memory 1008. The processor 1004, the memory 1008, and the communications interface 1006 communicate with each other using the bus 1002. The communications interface 1006 is configured to communicate with a switch.

The processor 1004 may be a central processing unit (CPU). The memory 1008 may include a volatile memory, for example, a RAM. The memory 1008 may further include a non-volatile memory, for example, a ROM, a flash memory, an HDD, or an SSD. The controller 1000 communicates, using the communications interface 1006, with a switch managed by the controller 1000, for example, sends a flow table to the switch, and receives a packet from the switch or sends a packet to the switch.

The memory 1008 stores executable code, and the processor 1004 executes the executable code to execute an action on a controller side in the foregoing procedure. Further, the memory 1008 stores an operating system, a gateway, a flow table generation module, and a packet processing module. The operating system may be LINUX™, UNIX™, WINDOWS™, or the like. The processor 1004 executes the operating system to control the controller 1000. The gateway, the flow table generation module, and the packet generation module run on the operating system. The flow table generation module is configured to record a management port and a forwarding port of the switch, and generate a corresponding flow table and send the flow table to a corresponding switch using the communications interface 1006. The packet generation module is configured to generate various types of packets, including an ARP request and a port probe packet.

Figure 14:
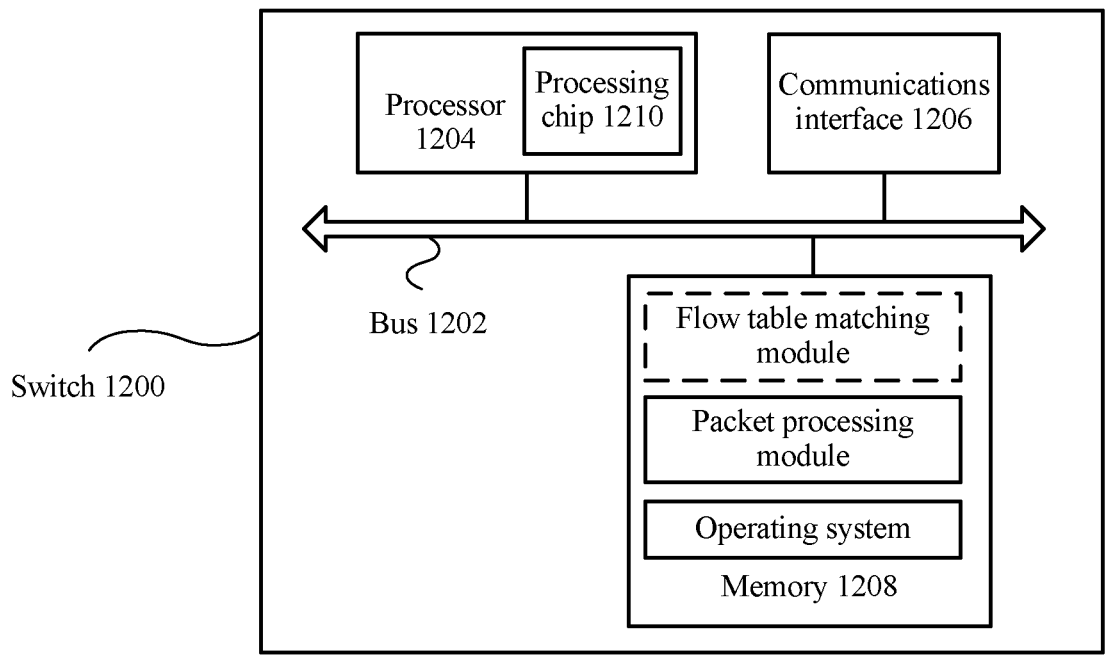
FIG. 14 is a schematic structural diagram of a switch according to this application.

FIG. 14 provides a switch 1200. The switch 1200 includes a bus 1202, a processor 1204, a communications interface 1206, and a memory 1208. The processor 1204, the memory 1208, and the communications interface 1206 communicate with each other using the bus 1202. All the switches in the foregoing network may use an architecture of the switch 1200. The processor 1204 is configured to execute an action on a switch side in the foregoing procedure.

The communications interface 1206 includes a forwarding port. The memory 1208 stores executable code.

The processor 1204 may be implemented using a combination of a processing chip 1210 and a CPU. The processing chip 1210 is implemented using an integrated circuit, and may be any one or any combination of an ASIC, a PLD, or a network processing unit. The PLD may be any one or any combination of a CPLD, an FPGA, or a GAL. The memory 1208 may include a volatile memory, such as a RAM. The memory 1208 may further include a non-volatile memory, such as a ROM, a flash memory, an HDD, or an SSD.

When the CPU of the processor 1204 works, a control plane of the switch 1200, that is, a host of the switch, is supported. The control plane communicates with a controller, receives content that is used to generate a flow table and that is delivered by the controller, generates the corresponding flow table, and sends the flow table to the processing chip 1210. The memory 1208 stores executable code, and the processor 1204 executes the executable code to execute an action on a switch side in the foregoing procedure. Further, the memory 1208 stores an operating system and a packet processing module. The operating system may be LINUX™ UNIX™ WINDOWS™, or the like. The processor 1204 executes the operating system to control the switch 1200. A gateway and the packet processing module run on the operating system. The packet processing module may be configured to generate a DHCP request, generate an ARP reply, generate a port reply packet, and the like. When the processing chip 1210 works, a forwarding plane of the switch 1200 is supported. The processing chip 1210 is internally provided with a memory that is configured to store a flow table to be sent by the processor 1204. The memory may be any one or any combination of a RAM, a ROM, a flash memory, an HDD, an SSD, or a ternary content addressable memory.

The processor 1204 may alternatively be implemented using only a CPU. In this case, when the CPU of the processor 1204 works, the control plane and the forwarding plane of the switch 1200 are supported. The processor 1204 receives, using the communications interface 1206, content that is used to generate a flow table and that is delivered by the controller, generates the corresponding flow table, and sends the flow table to the memory 1208. The memory 1208 further stores a flow table matching module, and the processor 1204 matches a packet with a flow table based on the flow table matching module, and processes the packet based on an action field of the flow table.

A description of a procedure corresponding to each of the foregoing drawings has a focus. For a part that is not described in detail in a procedure, refer to a related description of another procedure.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium (for example, an SSD).

What is claimed is:

1. A network comprising:
a controller;
a first switch comprising:
a first management port;
a first forwarding port coupled to the first management port;
a second forwarding port coupled to the controller and a Dynamic Host Configuration Protocol (DHCP) server when the controller and the DHCP server are disposed on a same physical server; and
a third forwarding port,
wherein the first switch is configured to:
generate a first DHCP request;
match a first preset flow table with the first DHCP request; and
send the first DHCP request through all available forwarding ports of the first switch based on the first preset flow table; and
a second switch comprising a fourth forwarding port coupled to the third forwarding port, wherein the second switch is configured to:
receive the first DHCP request from the first switch;
determine that the first DHCP request does not match a third preset flow table of the second switch;
discard the first DHCP request after determining that the first DHCP request does not match the third preset flow table;
generate a second DHCP request in response to discarding the first DHCP request; and
send the second DHCP request to the first switch using the fourth forwarding port, wherein the first switch is further configured to:
receive a first DHCP reply from the DHCP server in response to the first DHCP request;
match a second preset flow table with the first DHCP reply;
send the first DHCP reply through all the available forwarding ports of the first switch based on the second preset flow table;
receive, using the first management port, the first DHCP reply sent through the first forwarding port;
receive the second DHCP request from the third forwarding port;
determine that the second DHCP request does not match the first preset flow table or the second preset flow table; and
discard the second DHCP request after determining that the second DHCP request does not match the first preset flow table or the second preset flow table,
wherein the first switch is further configured to establish a Transmission Control Protocol (TCP) connection to the controller based on an Internet Protocol (IP) address of the first switch carried in the first DHCP reply.

2. The network of claim 1, wherein a source media access control (MAC) address of the first DHCP request is a MAC address of the first switch, and wherein the first preset flow table instructs to send a first packet comprising a source MAC address set to the MAC address of the first switch through all the available forwarding ports of the first switch.

3. The network of claim 1, wherein a destination media access control (MAC) address of the first DHCP reply is a MAC address of the first switch, and wherein the second preset flow table instructs to send a second packet comprising a destination MAC address set to the MAC address of the first switch through all the available forwarding ports of the first switch.

4. The network of claim 1, wherein the controller is configured to:
generate a first flow table instructing to send a packet whose destination is the first switch through the first forwarding port; and
send the first flow table to the first switch, wherein a priority of the first flow table is higher than that of the second preset flow table, or wherein the first switch is further configured to delete the second preset flow table after receiving the first flow table.

5. The network of claim 4, wherein the controller is further configured to:
generate a first Address Resolution Protocol (ARP) probe flow table, wherein the first ARP probe flow table instructs to report, to the controller, an ARP type packet comprising a source IP address set to the IP address of the first switch;
send the first ARP probe flow table to the first switch;
generate a first ARP request, wherein a destination IP address of the first ARP request is the IP address of the first switch;
send the first ARP request to the first switch; and
instruct the first switch to send the first ARP request through all the available forwarding ports of the first switch,
wherein the first switch is further configured to:
receive the first ARP probe flow table;
receive, using the first management port, the first ARP request sent through the first forwarding port;
generate a first ARP reply based on the first ARP request, wherein a source IP address of the first ARP reply is the IP address of the first switch;
send the first ARP reply to the first forwarding port using the first management port;
match the first ARP probe flow table with the first ARP reply; and
report the first ARP reply and a port number of the first forwarding port based on the first ARP probe flow table, and
wherein the controller is further configured to generate the first flow table based on the first ARP reply and the port number of the first forwarding port.

6. The network of claim 4, wherein the controller is further configured to:
generate a second flow table instructing to send a packet comprising a destination set to controller or the DHCP server through the second forwarding port; and
send the second flow table to the first switch, wherein a priority of the second flow table is higher than that of the first preset flow table, or wherein the first switch is further configured to delete the first preset flow table after receiving the second flow table.

7. The network of claim 6, wherein the controller is further configured to:
generate a second Address Resolution Protocol (ARP) probe flow table, wherein the second ARP probe flow table instructs to report, to the controller, an ARP type packet comprising a source IP address set to an IP address of the controller;
send the second ARP probe flow table to the first switch;
generate a second ARP request, wherein a destination IP address of the second ARP request is the IP address of the controller;
send the second ARP request to the first switch; and instruct the first switch to send the second ARP request through all the available forwarding ports of the first switch, wherein the first switch is further configured to:
receive the second ARP probe flow table; and
send the second ARP request to the controller through the second forwarding port, wherein the controller is further configured to:
generate a second ARP reply based on the second ARP request, wherein a source IP address of the second ARP reply is the IP address of the controller; and
send the second ARP reply to the first switch, wherein the first switch is further configured to:
receive the second ARP reply using the second forwarding port;
match the second ARP probe flow table with the second ARP reply; and
report the second ARP reply and a port number of the second forwarding port based on the second ARP probe flow table, and wherein the controller is further configured to generate the second flow table based on the second ARP reply and the port number of the second forwarding port.

8. The network of claim 4, wherein the second switch further comprises:
a second management port; and
a fifth forwarding port coupled to the second management port, wherein the controller is further configured to:
generate a third flow table instructing to send a packet comprising a destination set to the second switch through the third forwarding port;
send the third flow table to the first switch;
generate a fourth flow table instructing to send a packet comprising a destination set to the second switch through the fifth forwarding port;
send the fourth flow table to the second switch;
generate a fifth flow table instructing to send a packet comprising a destination set to the controller, the DHCP server, or the first switch through the fourth forwarding port; and
send the fifth flow table to the second switch.

9. The network of claim 8, wherein the controller is further configured to:
generate a first port probe flow table instructing to report a port reply packet to the controller;
send the first port probe flow table to the first switch;
generate a first port probe packet; and
send the first port probe packet to the second switch using the first switch, wherein the second switch is further configured to:
receive the first port probe packet;
generate a first port reply packet based on the preset flow table of the second switch; and
send the first port reply packet to the first switch, wherein the first switch is further configured to:
receive the first port reply packet through the third forwarding port;
match the first port probe flow table with the first port reply packet; and
report the first port reply packet and a port number of the third forwarding port based on the first port probe flow table, and wherein the controller is further configured to generate the third flow table based on the first port reply packet and the port number of the third forwarding port.

10. The network of claim 8, wherein the first switch is further configured to:
receive the second flow table instructing to send a packet whose destination is the controller or the DHCP server through the second forwarding port;
match the second DHCP request with the second flow table;
send the second DHCP request to the DHCP server using the second forwarding port;
receive a second DHCP reply from the DHCP server, wherein a destination of the second DHCP reply is the second switch, wherein the second DHCP reply carries an IP address of the second switch, and wherein the second DHCP reply is based on the second DHCP request;
match the second DHCP reply with the third flow table; and
send the second DHCP reply to the second switch using the third forwarding port, and wherein the second switch is further configured to:
receive the second DHCP reply;
obtain the IP address of the second switch; and
establish a TCP connection to the controller based on the IP address of the second switch.

11. The network of claim 10, wherein the controller is further configured to:
generate a third ARP probe flow table instructing to report, to the controller, an ARP type packet comprising a source IP address set to the IP address of the second switch;
send the third ARP probe flow table to the second switch;
generate a third ARP request, wherein a destination IP address of the third ARP request is the IP address of the second switch;
send the third ARP request to the second switch; and
instruct the second switch to send the third ARP request through all available forwarding ports of the second switch, wherein the second switch is further configured to:
receive the third ARP probe flow table;
receive, using the second management port, the third ARP request sent through the fifth forwarding port;
generate a third ARP reply based on the third ARP request, wherein a source IP address of the third ARP reply is the IP address of the second switch;
send the third ARP reply to the fifth forwarding port using the second management port;
match the third ARP probe flow table with the third ARP reply; and
report the third ARP reply and a port number of the fifth forwarding port based on the third ARP probe flow table, and wherein the controller is further configured to generate the fourth flow table based on the third ARP reply and the port number of the fifth forwarding port.

12. A network management method implemented by a controller, wherein the network management method is applied to a network comprising a first switch and the controller, wherein a control plane of the first switch is coupled to a first forwarding port of the first switch using a first management port of the first switch, wherein a second forwarding port of the first switch is coupled to the controller, and wherein the network management method comprises:
generating a first Address Resolution Protocol (ARP) probe flow table, wherein the first ARP probe flow table instructs to report, to the controller, an ARP type packet comprising a source Internet Protocol (IP) address set
to an IP address of the first switch;
sending the first ARP probe flow table to the first switch;
generating a first ARP request, wherein a destination IP
address of the first ARP request is the IP address of the
first switch;
sending the first ARP request to the first switch;
instructing the first switch to send the first ARP request
through all available forwarding ports of the first
switch;
obtaining a first ARP reply and a port number of the first
forwarding port from a forwarding plane of the first
switch based on the first ARP probe flow table, wherein
the first ARP reply is generated by the control plane of
the first switch based on the first ARP request and sent
to the forwarding plane of the first switch through the
first forwarding port, and wherein a source IP address
of the first ARP reply is the IP address of the first
switch;
generating a first flow table based on the first ARP reply
and the port number of the first forwarding port,
wherein the first flow table instructs to send a packet
whose destination is the first switch through the first
forwarding port; and
sending the first flow table to the first switch.

13. The network management method of claim 12, further comprising:
generating a second ARP probe flow table instructing to
report, to the controller, an ARP type packet comprising
a source IP address set to an IP address of the controller;
sending the second ARP probe flow table to the first
switch;
generating a second ARP request, wherein a destination IP
address of the second ARP request is the IP address of
the controller;
sending the second ARP request to the first switch;
instructing the first switch to send the second ARP request
through all the available forwarding ports of the first
switch;
receiving the second ARP request from the first switch
through the second forwarding port;
generating a second ARP reply based on the second ARP
request, wherein a source IP address of the second ARP
reply is the IP address of the controller;
sending the second ARP reply to the forwarding plane of
the first switch through the second forwarding port;
obtaining the second ARP reply and a port number of the
second forwarding port from the forwarding plane of
the first switch based on the second ARP probe flow
table;
generating a second flow table based on the second ARP
reply and the port number of the second forwarding
port, wherein the second flow table instructs to send a
packet comprising a destination set to the controller
through the second forwarding port; and
sending the second flow table to the first switch.

14. The network management method of claim 12, wherein the network further comprises a second switch, wherein the second switch communicates with the controller using the first switch, wherein a third forwarding port of the first switch is coupled to a fourth forwarding port of the second switch, and wherein the network management method further comprises:
generating a first port probe flow table instructing to
report a port reply packet to the controller;
sending the first port probe flow table to the first switch;
generating a first port probe packet;
sending the first port probe packet to the second switch
using the first switch;
obtaining a first port reply packet and a port number of the
third forwarding port from the forwarding plane of the
first switch based on the first port probe flow table,
wherein the first port reply packet is generated by a
control plane of the second switch based on the first
port probe packet and sent to the forwarding plane of
the first switch through the third forwarding port;
generating a third flow table based on the first port reply
packet and the port number of the third forwarding port,
wherein the third flow table instructs to send a packet
comprising a destination set to the second switch
through the third forwarding port; and
sending the third flow table to the first switch.

15. The network management method of claim 14, wherein the second switch establishes a TCP connection to the controller, wherein the control plane of the second switch is coupled to a fifth forwarding port of the second switch using a second management port of the second switch, and wherein the network management method further comprises:
generating a third ARP probe flow table instructing to
report, to the controller, an ARP type packet comprising
a source IP address set to an IP address of the second
switch;
sending the third ARP probe flow table to the second
switch;
generating a third ARP request, wherein a destination IP
address of the third ARP request is the IP address of the
second switch;
sending the third ARP request to the second switch
instructing the second switch to send the third ARP
request through all available forwarding ports of the
second switch;
obtaining a third ARP reply and a port number of the fifth
forwarding port from a forwarding plane of the second
switch based on the third ARP probe flow table,
wherein the third ARP reply is generated by the control
plane of the second switch based on the third ARP
request and sent to the forwarding plane of the second
switch through the fifth forwarding port, and wherein a
source IP address of the third ARP reply is the IP
address of the second switch;
generating a fourth flow table based on the third ARP
reply and the port number of the fifth forwarding port,
wherein the fourth flow table instructs to send a packet
comprising a destination set to the second switch
through the fifth forwarding port; and
sending the fourth flow table to the second switch.

16. The network management method of claim 15, further comprising:
generating a second port probe flow table instructing to
report a port probe packet to the controller;
sending the second port probe flow table to the second
switch;
generating a second port probe packet;
sending the second port probe packet to the forwarding
plane of the second switch through the fourth forwarding port of the second switch;
obtaining the second port probe packet and a port number
of the fourth forwarding port from the forwarding plane
of the second switch based on the second port probe
flow table;
generating a fifth flow table based on the second port
probe packet and the port number of the fourth forwarding port, wherein the fifth flow table instructs to send a packet comprising a destination set to the first switch or the controller through the fourth forwarding port; and sending the fifth flow table to the second switch.

17. A controller comprising:

a memory configured to store instructions; and a processor coupled to the memory, wherein the instructions cause the processor to be configured to:

generate a first Address Resolution Protocol (ARP) probe flow table instructing to report, to the controller, an ARP type packet comprising a source Internet Protocol (IP) address set to an IP address of the first switch;

send the first ARP probe flow table to a first switch, wherein a control plane of the first switch is coupled to a first forwarding port of the first switch using a management port of the first switch, and wherein a second forwarding port of the first switch is coupled to the controller;

generate a first ARP request, wherein a destination IP address of the first ARP request is the IP address of the first switch;

send the first ARP request to the first switch;

instruct the first switch to send the first ARP request through all available forwarding ports of the first switch;

obtain, a first ARP reply and a port number of the first forwarding port from a forwarding plane of the first switch based on the first ARP probe flow table, wherein the first ARP reply is generated by the control plane of the first switch based on the first ARP request and sent to the forwarding plane of the first switch through the first forwarding port, and wherein a source IP address of the first ARP reply is the IP address of the first switch;

generate a first flow table based on the first ARP reply and the port number of the first forwarding port, wherein the first flow table instructs to send a packet comprising a destination set to the first switch through the first forwarding port.

18. A switch management method applied to a first switch, wherein a control plane of the first switch is coupled to a first forwarding port of the first switch using a management port of the first switch, wherein a third forwarding port of the first switch is coupled to a fourth forwarding port of a second switch, wherein a second forwarding port of the first switch is coupled to a Dynamic Host Configuration Protocol (DHCP) server and a controller when the controller and the DHCP server are disposed on a same physical server, and wherein the switch management method comprises:

generating, by the control plane of the first switch, a first DHCP request;

sending, by the control plane of the first switch, the first DHCP request to a forwarding plane of the first switch through the management port of the first switch;

matching, by the forwarding plane of the first switch, a first preset flow table with the first DHCP request;

sending, by the forwarding plane of the first switch, the first DHCP request through all available forwarding ports of the first switch based on the first preset flow table;

receiving, by the forwarding plane of the first switch, a first DHCP reply that is based on the first DHCP request of the DHCP server;

matching, by the forwarding plane of the first switch, a second preset flow table with the first DHCP reply;

sending, by the forwarding plane of the first switch, the first DHCP reply through all the available forwarding ports of the first switch based on the second preset flow table;

receiving, by the control plane of the first switch using the management port of the first switch, the first DHCP reply sent through the first forwarding port;

receiving, by the forwarding plane of the first switch from the third forwarding port, a second DHCP request from the second switch;

determining, by the forwarding plane of the first switch, that the second DHCP request does not match the first preset flow table or the second preset flow table; and discarding, by the forwarding plane of the first switch, the second DHCP request; and establishing a Transmission Control Protocol (TCP) connection to the controller based on an Internet Protocol (IP) address of the first switch carried in the first DHCP reply.

19. The switch management method of claim 18, further comprising:

receiving, by the forwarding plane of the first switch, a first ARP probe flow table from the controller, wherein the first ARP probe flow table instructs to report, to the controller, an ARP type packet comprising a source IP address set to an IP address of the first switch carried in the first DHCP reply;

receiving, by the forwarding plane of the first switch, a first ARP request from the controller, wherein a destination IP address of the first ARP request is the IP address of the first switch;

sending, by the forwarding plane of the first switch, the first ARP request through all the available forwarding ports of the first switch based on an instruction of the controller;

receiving, by the control plane of the first switch using the management port of the first switch, the first ARP request sent through the first forwarding port;

generating, by the control plane of the first switch, a first ARP reply based on the first ARP request, wherein a source IP address of the first ARP reply is the IP address of the first switch;

sending, by the control plane of the first switch, the first ARP reply to the forwarding plane of the first switch through the first forwarding port;

matching, by the forwarding plane of the first switch, the first ARP probe flow table with the first ARP reply;

reporting, by the forwarding plane of the first switch, the first ARP reply and a port number of the first forwarding port to the controller based on the first ARP probe flow table; and receiving, by the forwarding plane of the first switch, a first flow table from the controller, wherein the first flow table instructs to send a packet comprising a destination set to the first switch through the first forwarding port, and wherein either a priority of the first flow table is higher than that of the second preset flow table or the first switch deletes the second preset flow table after receiving the first flow table.

20. The switch management method of claim 18, further comprising:

receiving, by the forwarding plane of the first switch, a second ARP probe flow table from the controller, wherein the second ARP probe flow table instructs to report, to the controller, an ARP type packet whose source IP address is an IP address of the controller;

receiving, by the forwarding plane of the first switch, a second ARP request from the controller, wherein a destination IP address of the second ARP request is the IP address of the controller;

sending, by the forwarding plane of the first switch, the second ARP request through all the available forwarding ports of the first switch based on an instruction of the controller;

receiving, by the forwarding plane of the first switch, a second ARP reply through the second forwarding port, wherein the second ARP reply is generated by the controller based on the second ARP request, and wherein a source IP address of the second ARP reply is the IP address of the controller;

reporting, by the forwarding plane of the first switch, the second ARP reply and a port number of the second forwarding port based on the second ARP probe flow table; and receiving, by the forwarding plane of the first switch, a second flow table from the controller, wherein the second flow table instructs to send a packet comprising a destination set to the controller or the DHCP server through the second forwarding port, and wherein either a priority of the second flow table is higher than that of the first preset flow table or the first switch deletes the first preset flow table after receiving the second flow table.

\* \* \* \* \*

UNITED STATES PATENT AND TRADEMARK OFFICE
CERTIFICATE OF CORRECTION

| | | |
|---|---|---|
| PATENT NO. | : 11,223,597 B2 | Page 1 of 1 |
| APPLICATION NO. | : 16/897000 | |
| DATED | : January 11, 2022 | |
| INVENTOR(S) | : Ding et al. | |

It is certified that error appears in the above-identified patent and that said Letters Patent is hereby corrected as shown below:

In the Claims

Claim 18, Column 42, Line 13: "flow table; and" should read "flow table;"

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*